United States Patent [19]

Otsuka et al.

[11] 4,380,985
[45] Apr. 26, 1983

[54] FLOW RATE CONTROL SYSTEM FOR FLUID BEING SUPPLIED TO AN INTERNAL COMBUSTION ENGINE, HAVING INITIAL POSITION SETTING FUNCTION FOR FLOW RATE CONTROL VALVE ACTUATOR

[75] Inventors: Kazuo Otsuka, Higashikurume; Shin Narasaka, Yono; Shumpei Hasegawa, Niiza, all of Japan

[73] Assignee: Honda Giken Kogyo Kabushiki Kaisha, Tokyo, Japan

[21] Appl. No.: 281,118

[22] Filed: Jul. 7, 1981

[30] Foreign Application Priority Data

Jul. 12, 1980 [JP] Japan ................... 55-095512

[51] Int. Cl.³ .................................. F02M 7/18
[52] U.S. Cl. ........................... 123/440; 123/589
[58] Field of Search ............ 123/361, 440, 585, 589, 123/489

[56] References Cited

U.S. PATENT DOCUMENTS 4,020,813  5/1977  Hattori et al. ................... 123/589
4,083,337  4/1978  Hattori et al. ................... 123/589
4,337,742  7/1982  Carlson et al. ................ 123/585 X Primary Examiner—Tony M. Argenbright
Attorney, Agent, or Firm—Lyon & Lyon

[57] ABSTRACT

A system for control of the flow rate of a fluid being supplied to an internal combustion engine. The system includes a flow rate control valve for controlling the flow rate of a fluid being supplied to the engine, a pulse motor for driving the flow rate control valve, position detecting means for detecting the position of the flow rate control valve with respect to a reference position to produce two different levels of output, depending upon a detected valve position, and an electrical circuit responsive to the output of the position detecting means to drive the pulse motor. At the start of the engine, the electrical circuit is operable to drive the pulse motor in directions as a function of the output of the position detecting means, stopping same upon a certain change in the level of the above output, which corresponds to the reference position and hence setting it to a predetermined position preset as a function of parameters of the operating condition of the engine. The system is also provided with a function of monitoring the actual pulse motor position as well as a fail safe diagnosis function for the position detecting means and its related parts.

12 Claims, 15 Drawing Figures

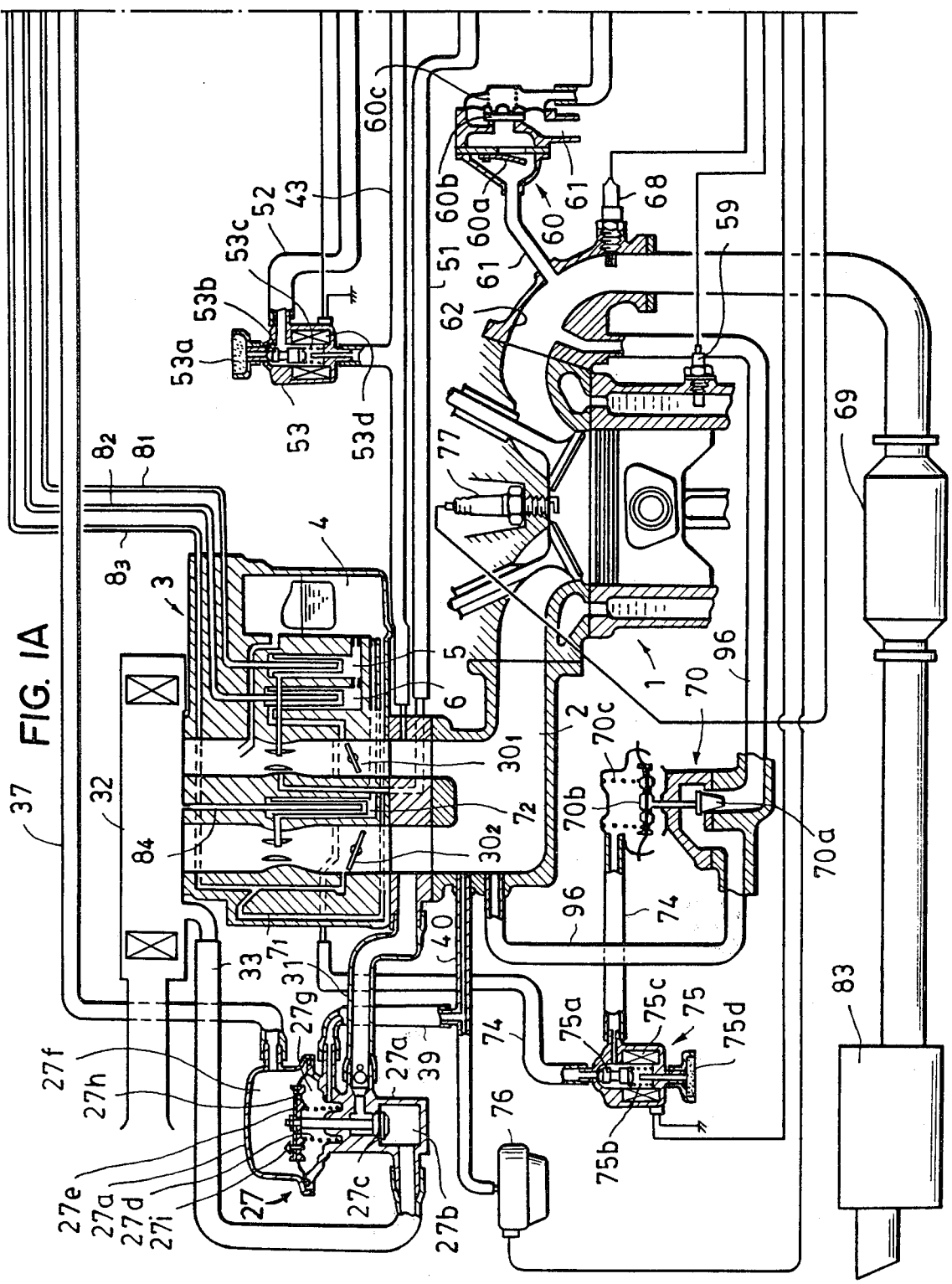
FIG. IA

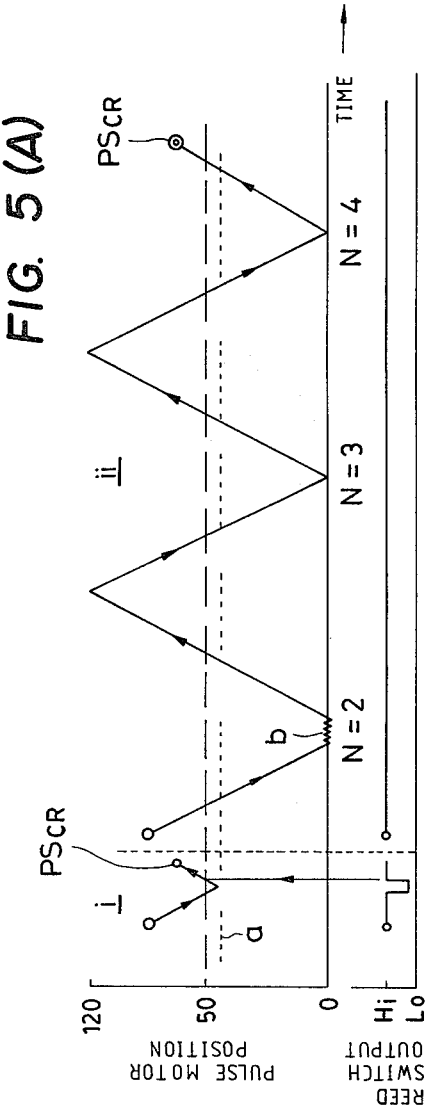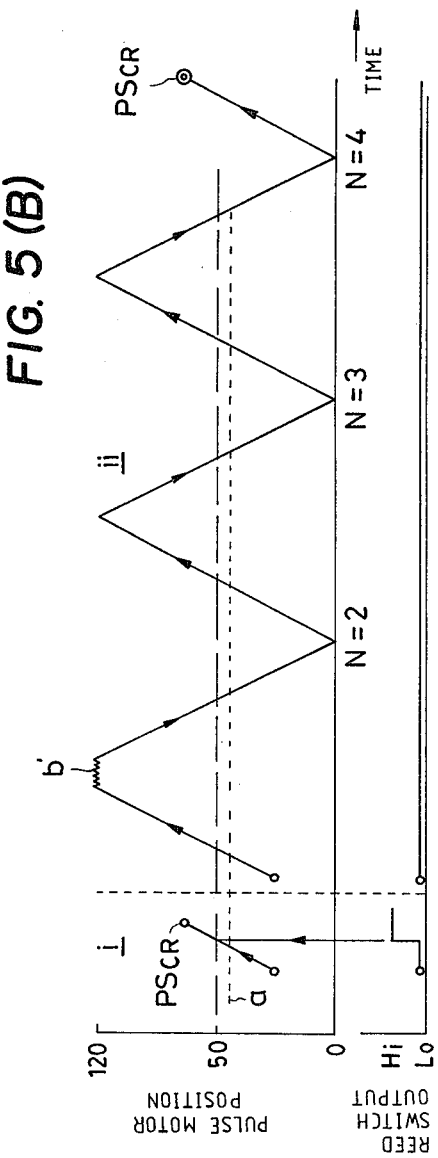

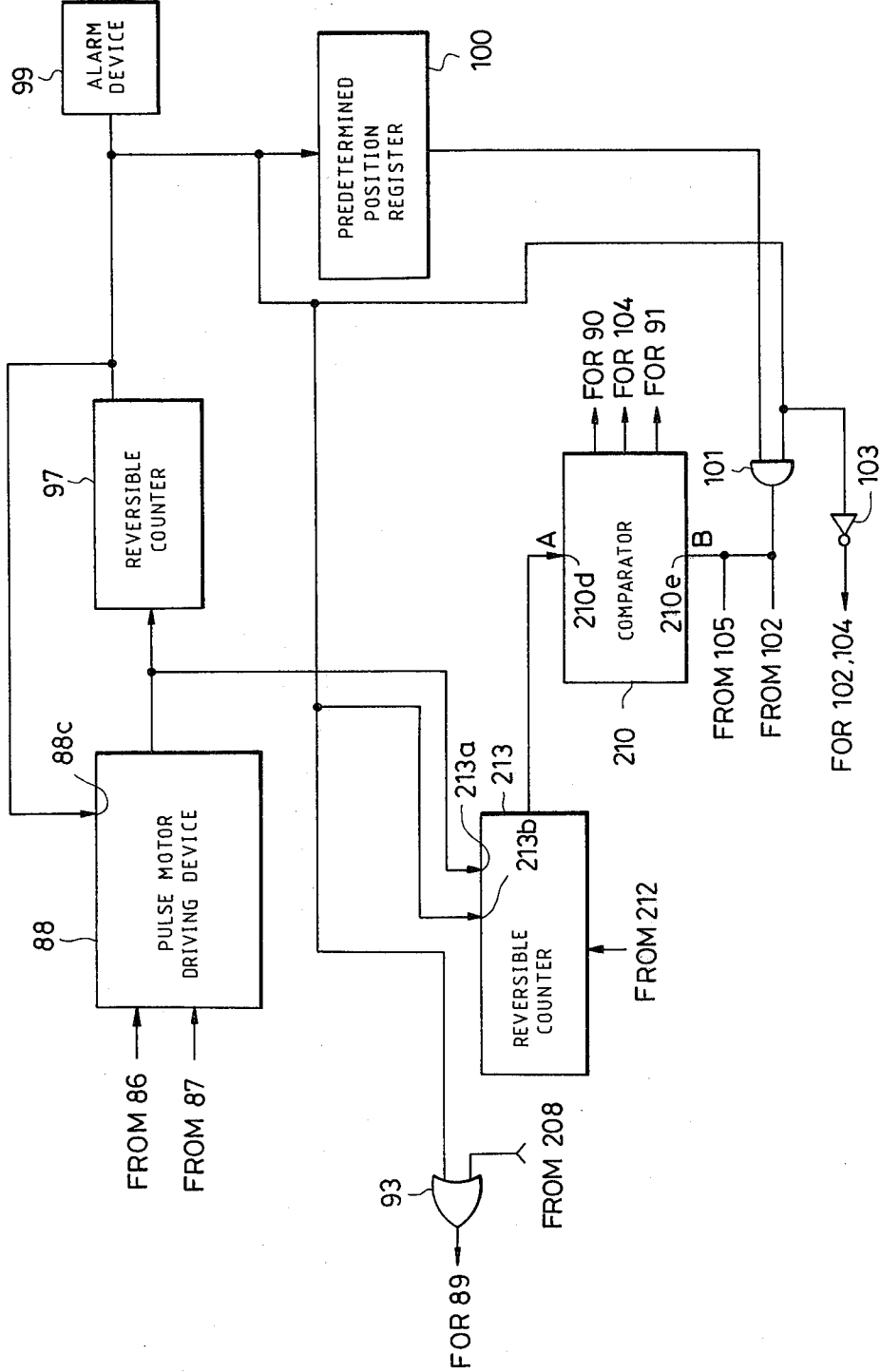

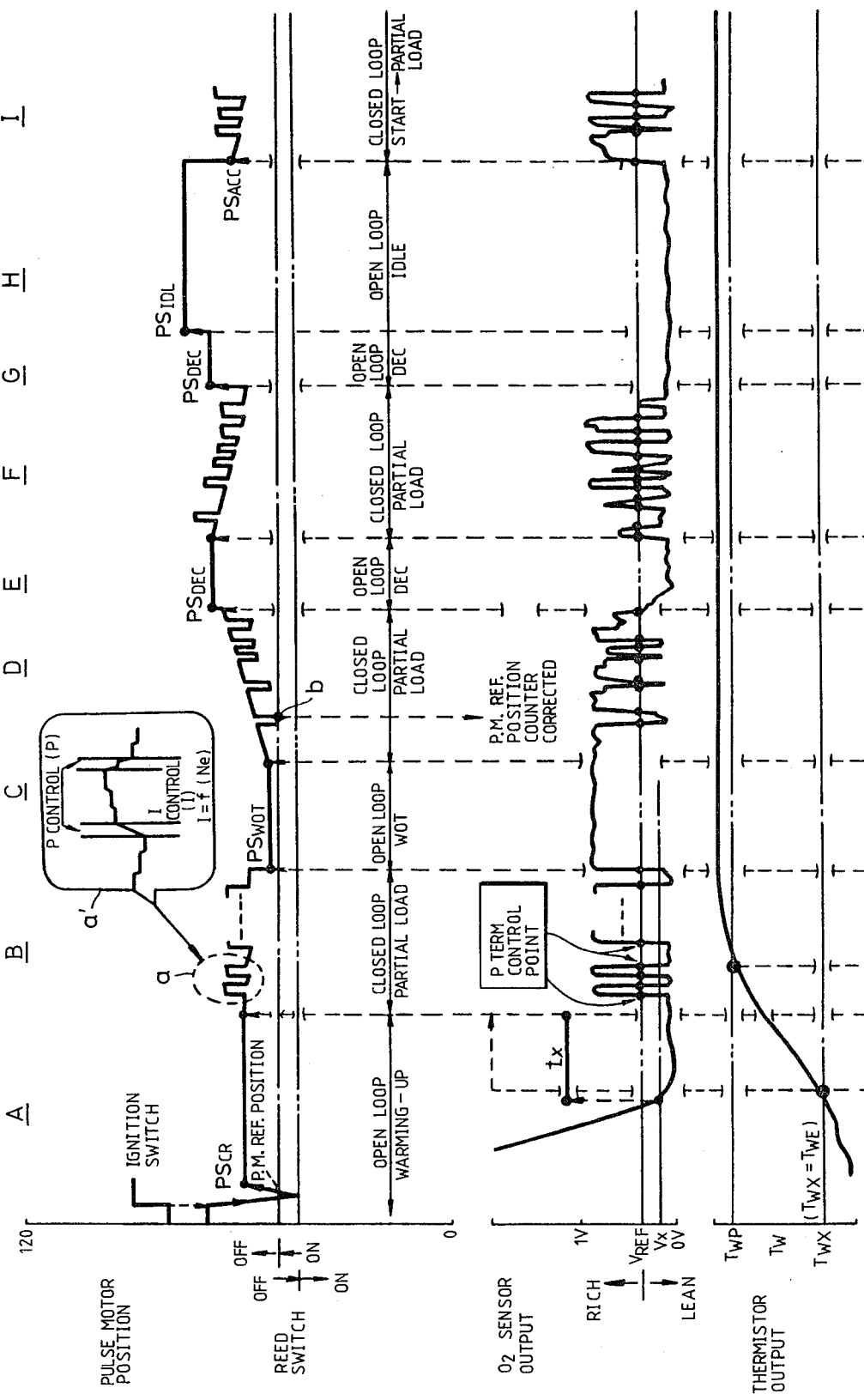

_FLOW RATE CONTROL SYSTEM FOR FLUID BEING SUPPLIED TO AN INTERNAL COMBUSTION ENGINE, HAVING INITIAL POSITION SETTING FUNCTION FOR FLOW RATE CONTROL VALVE ACTUATOR_

BACKGROUND OF THE INVENTION

This invention relates to a fluid flow rate control system for controlling the flow rate of a fluid (air or fuel) being supplied to an internal combustion engine, to thereby regulate the air/fuel ratio of a mixture composed of air and fuel, and more particularly to a device provided in such a control system and operable at the start of the engine to set a pulse motor used as an actuator for driving a fluid flow control valve at a predetermined initial position.

An air/fuel ratio control system is already known which is provided in combination with an internal combustion engine provided with a three-way catalyst mounted at the exhaust gas outlet and is operable in response to a signal from an exhaust gas ingredient sensor mounted at the exhaust gas outlet upstream of the three-way catalyst to achieve feedback control of the air/fuel ratio of an air/fuel mixture being supplied to the engine. An arrangement is also known that an air/fuel ratio control valve i.e., a fluid flow rate control valve is provided in an air passage connected to the air bleed or fuel passage of the carburetor or in an air passage directly connected to the intake manifold, the valve being arranged to be driven by a pulse motor.

However, the control circuit provided in such a conventional system using a pulse motor for driving the air/fuel ratio control valve is not adapted to determine the actual position of the air/fuel ratio control valve at the start of the engine. Therefore, conventionally air/fuel ratio control is started with the position of the air/fuel ratio control valve held at an initial position which the valve assumed immediately before the start of the engine. With such initial valve position, it is difficult to ensure good startability and driveability of the engine and low exhaust emission characteristics at the start and warming-up of the engine. Particularly, immediately after the start of the engine, usually the feedback control circuit is brought into an open loop mode, since the exhaust gas ingredient sensor which is usually formed of an O2 sensor is still inactive just after the start of the engine. On this occasion, if no control signal is given to the air/fuel ratio control valve for moving it from its initial position to a proper position, it will be the more unlikely that the requirements for the above-mentioned engine performances are fulfilled.

To cope with this situation, one would consider moving the rotor position of the pulse motor to a predetermined position and holding it there by mechanical means at the termination of operation of the engine. However, this method is not preferable, since it would require a structurally complicated device for carrying out this method.

It is preferable that the air/fuel ratio of a mixture being supplied to the engine should have a particular value appropriate for the starting and warming-up operation of the engine in order to obtain required startability, drive ability and exhaust emission characteristics of the engine. To this end, an arrangement that the valve position of the air/fuel ratio control valve is automatically held at a predetermined position at the start of the engine would be advantageous, particularly in a combination of the air/fuel ratio control valve with an air/fuel regulating device such as an automatic choke. Such arrangement facilitates setting of the opening of the automatic choke or the like and enables simplification of a control circuit associated with the air/fuel ratio control valve.

OBJECTS AND SUMMARY OF THE INVENTION

It is therefore an object of the invention to provide a fluid flow rate control system having an air/fuel ratio control function, which is adapted to determine the absolute position of the pulse motor at the start of the engine and hence move the pulse motor from the above absolute position to a predetermined position where the fluid flow rate control valve can be set at a position best suited for the starting and warming-up operation of the engine, to hold the pulse motor thereat to thereby obtain good startability and warming-up driveability of the engine as well as excellent exhaust emission characteristics thereof.

It is a further object of the invention to provide a fluid flow rate control system having an air/fuel control function, which is adapted to always monitor the actual position of the pulse motor to accurately recognize same, to thereby ensure highly accurate air/fuel ratio control particularly in open loop mode.

It is another object of the invention to provide a fluid flow rate control system having an air/fuel ratio control function, which has a fail safe diagnosis function to detect a failure in the pulse motor position detecting means or its related parts and set the pulse motor to a predetermined position where the expected influence upon subsequent engine operation can be kept at a minimum, while simultaneously carrying out an alarm action and other suitable actions.

The system according to the invention includes valve means for varying the flow rate of one of air and fuel, forming a fluid being supplied to an internal combustion engine to thereby control the air/fuel ratio of an air/fuel mixture being supplied to the engine; a pulse motor for driving the valve means; position detecting means for detecting the valve position of the valve means with respect to a reference position to produce two different levels of output depending upon a detected valve position, and an electrical circuit connected to the pulse motor, the position detecting means and a power switch. The electrical circuit is arranged for operation such that: (a) when the position detecting means produces one level of output upon turning on the power switch, the electrical circuit drives the pulse motor in the direction of the reference position until the position detecting means produces the other level of output; (b) when the position detecting means produces the other level of output upon turning on the power switch or when the position detecting means has come to produce the other level of output as a result of the above driving of the pulse motor in the paragraph (a), the electrical circuit drives the pulse motor in the direction of the reference position until the position detecting means produces the one level of output: and (c) the electrical circuit is responsive to occurrence of the one level of output during the above driving of the pulse motor in the paragraph (b), to stop the pulse motor.

The electrical circuit is further operable to drive the pulse motor from its stopping position in the above paragraph (c) by a predetermined number of steps as a function of parameters of the operating condition of the engine and then stopping the pulse motor.

The electrical circuit further includes a reversible counter for storing the actual position of the pulse motor; a register storing a predetermined value corresponding to the above reference position; and means responsive to a change in the output of the position detecting means from the other level to the one level to make the reversible counter have its counted value coincide with the predetermined value stored in the above register, thereby recognizing the actual pulse motor position with accuracy.

The electrical circuit still further includes means for driving the pulse motor to an extreme operating position thereof so long as there is no change in the level of output of the position detecting means during driving the pulse motor, means for driving the pulse motor within a predetermined operating range including the reference position a plurality of times over, after the pulse motor has been driven to the above extreme operating position, means for producing a signal indicative of abnormality where there is no change in the level of output of the position detecting means after the above plurality of times of driving the pulse motor, means responsive to the above signal indicative of abnormality to drive the pulse motor in a direction reverse to that in which it has so far been driven, to a predetermined position and holding it there, and means responsive to the above signal indicative of abnormality to give the alarm.

The above and other objects, features and advantages of the invention will be more apparent from the ensuing detailed description taken in connection with the accompanying drawings in which:

BRIEF DESCRIPTION

FIG. 5 is a graph illustrating the manner of displacement of the pulse motor at its initialization;

FIG. 11 is a partial circuit diagram of a modification of the circuit of FIG. 10.

DETAILED DESCRIPTION

The air/fuel ratio control system according to the invention will now be described in detail with reference to the accompanying drawings wherein an embodiment of the invention is illustrated.

Figure 1B:
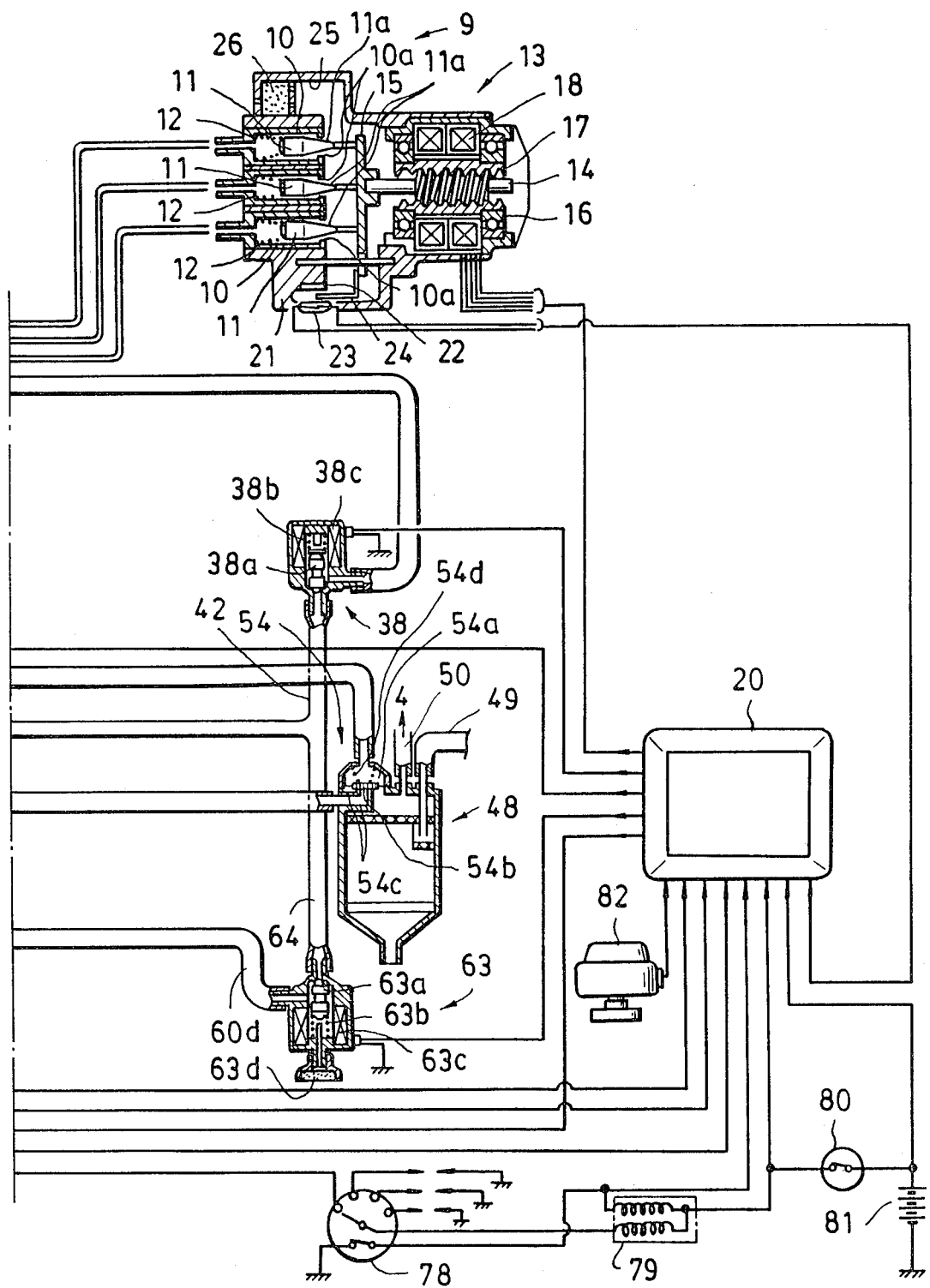
FIG. 1 is a combination of FIGS. 1A and 1B, and comprises a schematic illustration of the whole construction of an air/fuel ratio control system according to the present invention.

Referring now to FIG. 1, there is illustrated the whole system of the invention. Reference numeral 1 designates an internal combustion engine. Connected to the engine 1 is an intake manifold 2 which is provided with a carburetor generally designated by the numeral 3. The carburetor 3 has fuel passages 5, 6 which communicate a float chamber 4 with a primary bore. These fuel passages 5, 6 are connected to an air/fuel ratio control valve generally designated by the numeral 9, via air bleed passages $8_1$, $8_2$. The carburetor 3 also has fuel passages $7_1$, $7_2$ communicating the float chamber 4 with a secondary bore. The fuel passage $7_1$, on one hand, is connected to the above air/fuel ratio control valve 9 via an air passage $8_3$ and, on the other hand, opens in the secondary bore at a location slightly upstream of a throttle valve $30_2$ in the secondary bore. The fuel passage $7_2$ communicates with the interior of an air cleaner 32 via an air passage $8_4$ having a fixed orifice. The control valve 9 is comprised of three flow rate control valves, each of which is formed of a cylinder 10, a valve body 11 displaceably inserted into the cylinder 10, and a coil spring 12 interposed between the cylinder 10 and the valve body 11 for urging the valve body 11 in a predetermined direction. Each valve body 11 is tapered along its end portion 11a remote from the coil spring 12 so that the effective opening area of the opening 10a of each cylinder 10, in which the tapered portion 11a of the valve body is inserted, varies as the valve body 11 is moved. Each valve body 11 is disposed in urging contact with a connection plate 15 coupled to a worm element 14 which is axially movable but not rotatable about its own axis. The worm element 14 is in threaded engagement with the rotor 17 of a pulse motor 13 which is arranged about the element 14 and rotatably supported by radial bearings 16. Arranged about the rotor 17 is a solenoid 18 which is electrically connected to an electronic control unit (hereinafter called "ECU") 20. The solenoid 18 is energized by driving pulses supplied from ECU 20 to cause rotation of the rotor 17 which in turn causes movement of the worm element 14 threadedly engaging the rotor 17 in the leftward and rightward directions as viewed in FIG. 1. Accordingly, the connection plate 15 coupled to the worm element 14 is moved leftward and rightward in unison with the movement of the worm element 14.

The pulse motor 13 has its stationary housing 21 provided with a permanent magnet 22 and a reed switch 23 arranged opposite to each other. The plate 15 is provided at its peripheral edge with a magnetic shielding plate 24 formed of a magnetic material which is interposed between the permanent magnet 22 and the reed switch 23 for movement into and out of the gap between the two members 22, 23. The magnetic shielding plate 24 is displaced in the leftward and rightward directions in unison with displacement of the plate 15 in the corresponding directions. The reed switch 23 turns on or off in response to the displacement of the plate 24. That is, when the valve body 11 of the air/fuel ratio control valve 9 passes a reference position which is determined by the positions of the permanent magnet 22, reed switch 23 and magnetic shielding plate 24, the reed switch 23 turns on or off depending upon the moving direction of the valve body 11, to supply a corresponding binary output signal to ECU 20.

Incidentally, the pulse motor housing 21 is formed with an air intake 25 communicating with the atmosphere. Air is introduced through a filter 26 mounted in the air intake 25, into each flow rate control valve in the housing 21.

Reference numeral 27 designates a shot air valve. The casing 27a of the valve 27 has a lower chamber 27b which is, on one hand, connected to a conduit 31 opening in the secondary bore of the intake manifold at a location downstream of the throttle valve $30_2$, and, on the other hand, connected to a conduit 33 communicating with the air cleaner 32 situated on the upstream side of the venturi section. A valve body 27c is arranged within the lower chamber 27b for interrupting the communication between the conduits 31, 33. The casing 27a has an upper chamber divided in an upper air chamber 27f and a lower negative pressure chamber 27g by means of a diaphragm 27e connected to the valve body 27c and urged by a coil spring 27d. The diaphragm 27e is provided with an orifice 27h and a check valve 27i. The check valve 27i is adapted to allow only movement of air from the chamber 27g to the chamber 27f. The air chamber 27f communicates with a shot air cut valve 38 by way of a conduit 37, and the negative pressure chamber 27g with the intake manifold 2 by way of conduits 39, 40, respectively. The shot air valve 27 is adapted to operate such that when there occurs a sudden increase in the suction negative pressure within the intake manifold 2 which can be caused, for instance, by a sudden change in the throttle valve position from its full opening position to its full closing position, the diaphragm 27e is downwardly displaced to downwardly displace the valve body 27c for fresh air to be temporarily supplied into the intake manifold 2 through the conduits 33, 31 to make leaner the mixture being supplied to the engine, which is then too rich, to thereby prevent misfire as well as explosive combustion of unburned fuel within the exhaust system of the engine. Incidentally, during operation of the shot air valve 27, negative pressure is transmitted little by little through the orifice 27h from the negative pressure chamber 27g to the air chamber 27f so that the diaphragm 27e is returned into its original position by the force of the spring 27d shortly after its deformation. The check valve 27i is operable to allow air to rapidly escape therethrough from the negative pressure chamber 27g to the air chamber 27f when the pressure within the negative pressure chamber 27g exceeds that within the air chamber 27f, and have its valve body immediately returned to its original closed position as soon as the differential pressure between the chambers 27f, 27g has decreased to a certain level, to thereby enable the shot air valve 27 to properly operate during subsequent deceleration of the engine.

The shot air cut valve 38 communicates with a zone in the primary bore downstream of the throttle valve 44, by way of conduits 42, 43. This valve 38 is comprised of a valve body 38a arranged so as to interrupt the communication between the conduit 37 and the conduits 42, 43, a coil spring 38b arranged to urge the valve body 38a in its closing direction, and a solenoid 38c arranged to be energized by a control signal from ECU 20. This valve 38 is a normally closed type and is responsive to a command from ECU 20 at the start of the engine, to come into its open position to introduce negative pressure from the intake manifold 2 to the air chamber 27f of the shot air valve 27 to make zero the differential pressure between the chambers 27f, 27g, rendering the shot air valve 27 inoperative. Thus, misfire within the engine cylinders can be avoided which would otherwise be caused by temporary dilution of a suction mixture due to the operation of the shot air valve at the start of the engine.

Reference numeral 48 denotes a canister which has its interior communicating with a fuel tank, not shown, and the upper portion of the float chamber 4 of the carburetor 3 by way of conduits 49, 50, respectively, to be supplied with evaporated fuel from the fuel tank and the float chamber 4. Connected to the canister 48 area conduit 51 which opens at its one end in the primary venturi of the carburetor 3, and a conduit 52 which communicates with the aforementioned conduit 43 by way of a solenoid valve (purge cut valve) 53. The canister 48 has a built-in valve 54 of the negative pressure responsive type which is formed of a diaphragm 54b which defines, in cooperation with the canister casing, a pressure chamber 54a communicating with the conduit 52, a valve seat 54c formed integrally on the peripheral wall of the canister 48 and having a bore communicating with the conduit 51, and a spring 54d arranged to urge the diaphragm 54b against the valve seat 54c. On the other hand, the solenoid valve 53 is formed of an air intake 53a provided with a filter and communicating with the atmoshere, a valve body 53b displaceable to interrupt the communication between the air intake 53a and the conduit 52, a spring 53c disposed to urge the valve body 53b in its closing direction, and a solenoid 53d disposed to be energized by a control signal from ECU 20. With this arrangement, when the solenoid valve 53 is inoperative, negative pressure produced in the intake manifold 2 at a zone downstream of the throttle valve 44 during operation of the engine is introduced into the pressure chamber 54a through the conduits 43, 52 to cause the diaphragm 54b to be displaced against the force of the spring 54d in the valve opening direction. Thus, the valve 54 is opened to allow fuel vapor absorbed in the canister 48 to be supplied or purged to the primary venturi through the conduit 51.

The solenoid valve 53 is operated at the start of the engine to allow the conduit 52 to communicate with the atmosphere through the air intake 53a to cause the valve 54 to close so that supply of fuel vapor absorbed in the canister 48 to the primary venturi or purging is temporarily suspended (purge cut). This operation is necessary by reason that at the start of the engine the amount of suction air is limited due to closing of the choke valve, not shown, located upstream of the venturi to render the mixture in the intake manifold 2 sufficiently rich, and therefore supply of fuel vapor in the canister 48 to the intake manifold 2 would render the mixture in the manifold 2 too rich. Therefore, at the start of the engine the solenoid valve 53 is operated to cause temporary suspension of the supply of the fuel vapor from the canister 48 to the manifold 2. The supply of the fuel vapor from the canister 48 to the intake manifold 2 is started when the choke valve has been opened after the start of the engine and the engine temperature has exceeded a predetermined value due to warming-up of the engine following the start of the engine. The engine temperature can be represented by the temperature of engine cooling water which, in the embodiment shown in FIG. 1, is detected by a thermistor 59 inserted in the peripheral wall of a cylinder of the engine the interior of which wall is filled with cooling water. The detected value signal produced by the thermistor 59 is supplied to ECU 20. ECU 20 then compares the value of the detected value signal with a predetermined value, e.g., 70° C., stored therein. When the former exceeds the latter, ECU 20 interrupts the energization of the solenoid valve 53 which has been continued from the start of the engine, to cause communication of the conduit 52 with the conduit 43 to initiate supply of the fuel vapor absorbed in the canister 48 to the venturi through the valve 54 and the conduit 51.

Reference numeral 60 designates a secondary air valve which is comprised of a reed 60a arranged for closing a conduit 61, a diaphragm 60b mounted on the upstream side of the reed 60a for blocking the conduit 61, and a spring 60c disposed to permanently urge the diaphragm 60b in its closing direction. This valve 60 communicates, on one hand, with the exhaust manifold 62 via the conduit 61, and on the other hand, with the air cleaner 32, that is, the atmosphere via the same conduit 61, respectively. A conduit 60d communicates the valve 60 with a reed air cut valve 63 formed of a solenoid valve. The valve 63 dcommunicates with a zone in the intake manifold 2 downstream of the throttle valve 44 via conduits 64,43. The exhaust manifold 62 is provided with an O$_2$ sensor 68 which is projected in the manifold 62 to detect oxygen concentration in the exhaust gas and supply its output signal to ECU 20. The conduit 61 opens in the exhaust manifold 62 at a location upstream of the O$_2$ sensor 68. A three-way catalyst 62 is arranged across the exhaust output downstream of the O$_2$ sensor 68. The solenoid valve 63 is comprised of a valve body 63a disposed for interrupting the communication between the conduits 60d, 64, a spring 63b disposed to permanently urge the valve body 63a in its closing direction, a solenoid 63c disposed to be energized by a control signal from ECU 20, and an air intake 63d arranged for communication with the conduit 60d when the valve is closed. When the solenoid 63c is energized, the valve 63 allows negative pressure produced in the intake manifold 2 at a zone downstream of the throttle valve 44 during operation of the engine to be introduced into the secondary air valve 60. The introduced negative pressure retracts the diaphragm 60b of the valve 60 to allow air (secondary air) to be introduced into the valve through the conduit 61. Then, when negative pressure is produced in the exhaust manifold 62, this air urges the reed 60a into its open position to be introduced into the exhaust manifold 62. This introduction of secondary air into the exhaust manifold 62 causes dilution of the exhaust gas with the secondary air to place the three-way catalyst 69 under an oxidizing atmosphere wherein HC and CO in the exhaust gas are well burned to obtain good purification of the exhaust gas.

However, if the above secondary air introduction is carried out by the reed valve 60 during air/fuel ratio feedback control based upon the detected value signal from the O$_2$ sensor 68 which will be hereinlater referred to, the detected value signal from the O$_2$ sensor which is located downstream of the valve 60 does not represent a proper air/fuel ratio, on the basis of which feedback control of the air/fuel ratio is to be carried out. Therefore, during feedback control of the air/fuel ratio the reed valve 60 is held inoperative by means of the solenoid valve 63 which is actuated by the control signal from ECU 20, that is, the valve 60 is made to operate only when particular open loop control conditions are met where the air/fuel ratio feedback control is not carried out.

A conduit 96 is provided which communicates the exhaust manifold 62 with the intake manifold 2, and an exhaust gas recirculation (EGR) valve 70 is arranged across the conduit 96 for closing the conduit 96. The valve 70 is of the negative pressure-responsive type which is comprised of a valve body 70a arranged for closing the conduit 69, a diaphragm 70b, and a spring 70c arranged to permanently urge the diaphragm 70b. The diaphragm 70b is displaceable to close or open the valve 70 in response to negative pressure produced at a negative pressure intake which is arranged to be located slightly upstream of the throttle valve 30l in its fully closed position in the carburetor 3, and transmitted to the diaphragm 70b via a conduit 74. As known, this EGR valve 70 serves to add exhaust gas which is no longer active, to the suction mixture to lower the maximum possible combustion temperature within the engien cylinders to thereby reduce the amount of NOx to be present in the exhaust gas. Recirculation of the exhaust gas, however, can cause combustion instability within the engine cylinders during low load operation of the engine such as idling and deceleration or in a cold state of the engine. To avoid this, an EGR control valve 75, which is a solenoid valve, is provided which is operable in such an engine state to interrupt the feed of negative pressure to the valve 70 and simultaneously allow introduction of air to the valve 70 to cause some to close. This valve 75 is formed of a valve body 75a arranged for closing the conduit 74, a spring 75b arranged to permanently urge the valve body 75a in its closing direction, a solenoid 75c arranged to be energized by a control signal from ECU 20, and an air intake 75d provided with a filter which can be communicated with the portion of the conduit 74 on the side of the EGR valve 70 when the valve 75 is closed. Detection of a low load condition of the engine is made by a pressure sensor 76 which is also used for air/fuel ratio control as hereinlater described and is sensitive to absolute pressure in the intake manifold 2 via a conduit 40 opening in the manifold 2. The sensor 76 supplies its detected value output signal to ECU 20 which in turn compares the value of this output signal with a predetermined value stored therein to control the solenoid valve 75 so that while the former value is lower than the latter one, the valve 75 is held in its closed position to prohibit transmission of negtive pressure to the diaphragm 70b, and when the former value exceeds the latter one, the valve 75 is brought into its open position to transmit negative pressure to the diaphragm 70b.

The engine temperature is detected by the thermistor 59, as previously noted. In a manner similar to that mentioned with respect to the detection of a low load condition of the engine, ECU 20 is responsive to the detected value output signal from the thermistor 59 to keep the solenoid valve 75 in its closed position so long as this value does not exceed a predetermined value.

In FIG. 1, reference numeral 77 designates an ignition plug, 78 a distributor, 70 an ignition coil, 80 an ignition switch, 81 a battery, 82 an atmospheric pressure sensor, and 83 a silencer, respectively. The distributor 78 has a drive shaft, not shown, which is arranged for rotation at a speed proportional to the engine speed, and accordingly pulses are produced in the ignition coil 79 which correspond in frequency to interrupting action of contact points or the output of a contactless pickup, the contact points and the contactless pickup being arranged to operate in synchronism with the rotation of the above drive shaft. The above pulses produced in the coil 79 are supplied to ECU 20. It will be noted that in the illustrated embodiment the distributor 78 and the ignition coil 79 form an engine rpm sensor.

Details of the air/fuel ratio control which can be performed by the air/fuel ratio control system according to the invention will now be described by reference to FIG. 1 which has been referred to hereinabove, and FIGS. 2 through 12.

Figure 2:
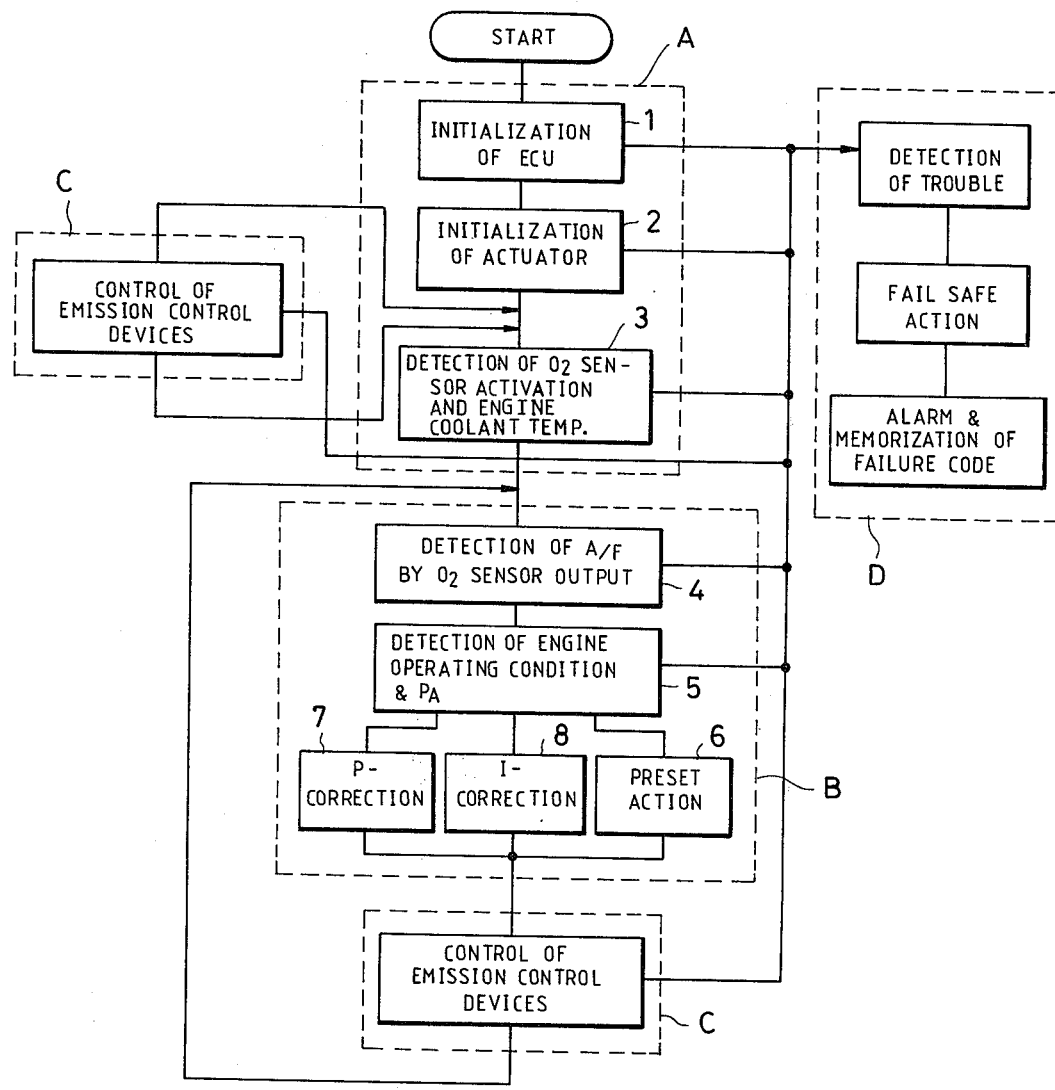
FIG. 2 is a flow diagram of the overall operation of the system according to the invention.

Referring first to FIG. 2, there is illustrated in the form of a flow diagram the programming of the whole air/fuel ratio control which is to be performed by the air/fuel ratio control system of the invention. The program comprises four functions, i.e., an initialization function (block A), a basic air/fuel ratio control function (block B), an additional function (block C), and a fail safe/diagnosis function (block D).

Initialization

Referring first to the initialization block A, when the ignition switch 80 in FIG. 1 is set on, ECU 20 is initialized at the step 1 to detect the reference position of the actuator or pulse motor 13 by means of the reed switch 23 and hence drive the pulse motor 13 to set it to its best position (a preset position) for starting the engine, that is, set the initial air/fuel ratio to a predetermined proper value (the step 2). The above preset position of the pulse motor 13 is hereinafter called "$PS_{CR}$". This setting of the initial air/fuel ratio is made on condition that the engine rpm Ne is lower than a predetermined value $N_{CR}$ (e.g., 400 rpm) and the engine is in a condition before firing. The predetermined value $N_{CR}$ is set at a value higher than the cranking rpm and lower than the idling rpm.

The above reference position of the pulse motor 13 is detected as the position at which the reed switch 23 turns on or off, as previously mentioned with reference to FIG. 1.

The, ECU 20 monitors the condition of activation of the $O_2$ sensor 68 and the coolant temperature Tw detected by the thermistor 59 to determine whether or not the engine is in a condition for initiation of the air/fuel ratio control (the step 3). For accurate air/fuel ratio feedback control, it is a requisite that the $O_2$ sensor 68 is fully activated and the engine is in a warmed-up condition. The $O_2$ sensor, which is made of stabilized zirconium dioxide or the like, has a characteristic that its internal resistance decreases as its temperature increases. If the $O_2$ sensor is supplied with electric current through a resistance having a suitable resistance value from a constant-voltage regulated power supply provided within ECU 20, the electrical potential or output voltage of the sensor initially shows a value close to the power supply voltage (e.g., 5 volts) when the sensor is not activated, and then, its electrical potential lowers with the increase of its temperature. Therefore, according to the invention, the air/fuel ratio feedback control is not initiated until after the conditions are fulfilled that the sensor produces an activation signal when its output voltage lowers down to a predetermined voltage Vx, a timer finishes counting for a predetermined period of time $t_x$ (e.g., 1 minute) starting from the occurrence of the above activation signal, and the coolant temperature Tw increases up to a predetermined value Twx at which the automatic choke is opened to an opening for enabling the air/fuel ratio feedback control. The reason for the provision of the above predetermined period of time $t_x$ for which the timer counts after the output potential of the $O_2$ sensor has reached the predetermined value Vx is that the predetermined value Vx is set at such a high value as to facilitate detecting activation of the $O_2$ with high accuracy in view of the natures of an actually available comparator circuit and its related parts as well as the fact that the smaller the output voltage of the sensor the smaller the variation rate of the same output voltage relative to time during warming-up of the engine. The $O_2$ sensor is still inactive when its output voltage just reaches the predetermined value Vx. Thus, according to the invention, a suitable period of time has to lapse after the predetermined value Vx is reached, to ensure initiation of the air/fuel ratio feedback control only after the output voltage of the $O_2$ has become fully low, that is, the $O_2$ sensor has been actually activated.

During warming-up of the engine, that is, when the $O_2$ sensor is inactive and the coolant temperature is low, unburned ingredients are emitted in large quantities from the engine. The secondary air valve 60 is opened during warming-up of the engine to cause the three-way catalyst 69 to operate under an oxydizing atmosphere to thereby largely reduce the amount of unburned exhaust components in the exhaust gas. Consequently, the detection of activation of the $O_2$ sensor is made in exhaust gas in a lean or high air/fuel ratio state.

During the above stage of the detection of activation of the $O_2$ sensor and the coolant temperature Tw, the pulse motor 13 is held at its predetermined position $PS_{CR}$. The pulse motor 13 is driven to appropriate positions in response to the operating condition of the engine after initiation of the air/fuel ratio control, as hereinlater described.

Basic Air/Fuel Ratio Control

Following the initialization block A, the program proceeds to the basic air/fuel ratio control block B. This block B includes an air/fuel ratio detection function 4 which is performed in response to the output signal of the $O_2$ sensor, a function 5 of detecting the operating condition of the engine and the atmospheric pressure $P_A$, a function 6 of presetting the pulse motor 13, a proportional term correction function 7, and an integral term correction function 8. These functions will now be described.

ECU 20 is responsive to various detected value signals representing the output voltage of the $O_2$ sensor 68, the absolute pressure in the intake manifold 2 detected by the pressure sensor 76, the engine rpm Ne detected by the rpm sensor 78, 79, and the atmospheric pressure $P_A$ detected by the atmospheric pressure sensor 82, to drive the pulse motor 13 as a function of these signals to control the air/fuel ratio. More specifically, the basic air/fuel ratio control comprises open loop control which is carried out at wide-open-throttle, at engine idle, and at engine deceleration, and closed loop control which is carried out at engine partial load. All the control is initiated after completion of the warming-up of the engine.

First, the condition of open loop control at wide-open-throttle is met when the differential pressure $P_A$-$P_B$ (gauge pressure) between the absolute pressure $P_B$ detected by the pressure sensor 76 and the atmospheric pressure $P_A$ (absolute pressure) detected by the atmospheric pressure sensor 82 is lower than a predetermined value $\Delta P_{WOT}$. ECU 20 compares the difference in value between the output signals of the sensors 76, 82 with the predetermined value $\Delta P_{WOT}$ stored therein, and when the relationship of $P_A$-$P_B$ < $\Delta P_{WOT}$ stands, drives the pulse motor 13 to a predetermined position (preset position) $PS_{WOT}$ and holds it there, which is a position best appropriate for the engine emissions to be obtained at the time of termination of the wide-open-throttle open loop control. At wide-open-throttle, a known economizer, not shown, or the like is actuated to supply a rich or small air/fuel ratio mixture to the engine.

The condition of open loop control at engine idle is met when the engine rpm Ne is lower than a predetermined idle rpm $N_{IDL}$ (e.g., 1,000 rpm). ECU 20 compares the output signal value Ne of the rpm sensor 78, 79 with the predetermined rpm $N_{IDL}$ stored therein, and when the relationship of $Ne<N_{IDL}$ stands, drives the pulse motor 13 to a predetermined idle position (preset position) $PS_{IDL}$ which is best suitable for the engine emissions and holds it there.

The condition of open loop control at engine deceleration is fulfilled when the absolute pressure $P_B$ in the intake manifold is lower than a predetermined value $PB_{DEC}$. ECU 20 compares the output signal value $P_B$ of the pressure sensor 76 with the predetermined value $PB_{DEC}$ stored therein, and when the relationship of $P_B<PB_{DEC}$ stands, drives the pulse motor 13 to a predetermined deceleration position (preset position) $PS_{DEC}$ best suitable for the engine emissions and holds it there.

The ground for this condition of open loop control at engine deceleration lies in that when the absolute pressure $P_B$ in the intake manifold drops below the predetermined value, unburned HC is produced at an increased rate in the exhaust gas, to make it impossible to carry out the air/fuel ratio feedback control based upon the detected value signal of the O₂ sensor with accuracy, thus failing to control the air/fuel ratio to a theoretical value. Therefore, according to the invention, the open loop control is employed, as noted above, when the absolute pressure $P_B$ in the intake manifold detected by the pressure sensor 76 is smaller than the predetermined value $PB_{DEC}$, where the pulse motor is set to the predetermined position $PS_{DEC}$ best suitable for the engine emissions obtained at the time of termination of the deceleration open loop control. At the beginning of engine deceleration, the shot air valve is actuated to supply air into the intake manifold to prevent the occurrence of unburned ingredients in the exhaust gas.

During operations of the above-mentioned open loop control at wide-open-throttle, at engine idle, at engine deceleration, the respective predetermined positions $PS_{WOT}$, $PS_{IDL}$, $PS_{DEC}$ for the pulse motor 13 are compensated for atmospheric pressure $P_A$, as hereinlater described.

On the other hand, the condition of closed loop control at engine partial load is met when the engine is in an operating condition other than the above-mentioned open loop control conditions. During the closed loop control, ECU 20 performs selectively feedback control based upon proportional term correction (hereinafter called "P term control") and feedback control based upon integral term correction (hereinafter called "I term control"), in response to the engine rpm Ne detected by the engine rpm sensor 78, 79 and the output signal of the O₂ sensor 68. To be concrete, the integral term correction is used when the output voltage of the O₂ sensor 68 varies only at the higher level side or only at the lower level side with respect to a reference voltage Vref, wherein the position of the pulse motor 13 is corrected by an integral value obtained by integrating the value of a binary signal which changes in dependence on whether the output voltage of the O₂ sensor is at the higher level or at the lower level with respect to the predetermined reference voltage Vref, to thereby achieve stable and accurate position control of the pulse motor 13. On the other hand, when the output signal of the O₂ sensor changes from the higher level to the lower level or vice versa, the proportional term correction is carried out wherein the position of the pulse motor 13 is corrected by a value directly proportional to a change in the output voltage of the O₂ sensor to thereby achieve air/fuel ratio control in a manner prompter and more efficient than the integral term correction.

As noted above, according to the above I term control, the pulse motor position is varied by an integral value by integrating the value of a binary signal corresponding to the change of the output voltage of the O₂ sensor. According to this I term control, the number of steps by which the pulse motor is to be displaced per second differs depending upon the speed at which the engine is then operating. That is, in a low engine rpm range, the number of steps by which the pulse motor is to be displaced is small. With an increase in the engine rpm, the above number of steps increases so that it is large in a high engine rpm range.

Whilst, according to the P term control which, as noted above, is used when there is a change in the output voltage of the O₂ sensor from the higher level to the lower one or vice versa with respect to the reference voltage Vref, the number of steps by which the pulse motor is to be displaced per second is set at a single predetermined value (e.g., 6 steps), irrespective of the engine rpm.

The air/fuel ratio control at engine acceleration (i.e., off-idle acceleration) is carried out when the engine rpm Ne exceeds the aforementioned predetermined idle rpm $N_{IDL}$ during the course of the engine speed increasing from a low rpm range to a high rpm range, that is, when the engine speed changes from a relationship $Ne<N_{IDL}$ to one $Ne\geq N_{IDL}$. On this occasion, ECU 20 rapidly moves the pulse motor 13 to a predetermined acceleration position (preset position) $PS_{ACC}$, and thereafter initiates the aforementioned air/fuel ratio feedback control. This predetermined position $PS_{ACC}$ is compensated for atmospheric pressure $P_A$, too, as hereinlater described.

The above-mentioned predetermined position $PS_{ACC}$ is set at a position where the amount of detrimental ingredients in the exhaust gas is small. Therefore, particularly at the so-called "standing start", i.e., acceleration from a vehicle-stopping position, setting the pulse motor position to the predetermined position $PS_{ACC}$ is advantageous to anti-exhaust measures, as well as to achievement of accurate air/fuel ratio feedback control to be done following the acceleration. This acceleration control is carried out under a warmed-up engine condition, too.

In transition from the above-mentioned various open loop control to the closed loop control at engine partial load or vice versa, changeover between open loop mode and closed loop mode is effected in the following manner: First, in changing from closed loop mode to open loop mode, ECU 20 moves the pulse motor 13 to an atmospheric pressure-compensated predetermined position $PSi(P_A)$ in a manner referred to later, irrespective of the position at which the pulse motor was located immediately before entering the open loop control. This predetermined position $PSi(P_A)$ includes preset positions $PS_{CR}$, $PS_{WOT}$, $PS_{IDL}$, $PS_{DEC}$ and $PS_{ACC}$, each of which is corrected in response to actual atmospheric pressure as hereinlater referred to. Various open loop control operations can be promptly done, simply by setting the pulse motor to the above-mentioned respective predetermined positions.

On the other hand, in changing from open loop mode to closed loop mode, ECU 20 commands the pulse motor 13 to initiate air/fuel ratio feedback control with I term correction. That is, there can be a difference in timing between the change of the output signal level of the $O_2$ sensor from the high level to the low level or vice versa and the change from the open loop mode to the closed loop mode. In such an event, the deviation of the pulse motor position from the proper position upon entering the closed loop mode, which is due to such timing difference, is much smaller in the case of initiating air/fuel ratio control with I term correction than that in the case of initiating it with P term correction, to make it possible to resume early accurate air/fuel ratio control and accordingly ensure highly stable engine emissions.

To obtain optimum exhaust emission characteristics irrespective of changes in the actual atmospheric pressure during open loop air/fuel ratio control or at the time of shifting from open loop mode to closed loop mode, the position of the pulse motor 13 needs to be compensated for atmospheric pressure. According to the invention, the above-mentioned predetermined or preset positions $PS_{CR}$, $PS_{WOT}$, $PS_{IDL}$, $PS_{DEC}$, $PS_{ACC}$ at which the pulse motor 13 is to be held during the respective open loop cotnrol operations are corrected in a linear manner as a function of changes in the atmospheric pressure $P_A$, using the following equation:

$$PSi(P_A) = PSi + (760 - P_A) \times Ci$$

where i represents any one of CR, WOT, IDL, DEC and ACC, accordingly PSi represents any one of $PS_{CR}$, $PS_{WOT}$, $PS_{IDL}$, $PS_{DEC}$ and $PS_{ACC}$ at 1 atmospheric pressure (=760 mmHg), and Ci a correction coefficient, representing any one of $C_{CR}$, $C_{WOT}$, $C_{IDL}$, $C_{DEC}$ and $C_{ACC}$. The values of PSi and Ci are previously stored in ECU 20.

ECU 20 applies to the above equation the coefficients PSi, Ci which are determined at proper different values according to the kinds of open loop control to be carried out, to calculate by the above equation the position $PSi(P_A)$ for the pulse motor 13 to be set at a required kind of open loop control and moves the pulse motor 13 to the calculated position $PSi(P_A)$.

By correcting the air/fuel ratio during open loop control in response to the actual atmospheric pressure in the abovementioned manner, it is possible to obtain not only conventionally known effects such as best driveability and prevention of burning of the ignition plug in an engine cylinder, but also optimum emission characteristics by setting the value of Ci at a suitable value, since the pulse motor position held during open loop control forms an initial position upon entering subsequent closed loop control.

The position of the pulse motor 13 which is used as the actuator for the air/fuel ratio control valve 9 is monitored by a position counter provided within ECU 20. However, there can occur a disagreement between the counted value of the position counter and the actual position of the pulse motor due to skipping or racing of the pulse motor. In such an event, ECU 20 operates on the counted value of the position counter as if it were the actual position of the pulse motor 13. However, this can impede proper setting of the air/fuel ratio during open loop control where the actual position of the pulse motor 13 must be accurately recognized by ECU 20.

In view of the above disadvantage, according to the air/fuel ratio control system of the invention, in addition to detection of the initial position of the pulse motor 13 by regarding as the reference position (e.g., 50th step) the position of the pulse motor at which the reed switch 23 turns on or off when the pulse motor is driven, which was previously noted with reference to the starting block A in FIG. 2, the position counter has its counted value replaced by the number of steps corresponding to the reference position (e.g., 50 steps) stored in ECU 20 upon the pulse motor 13 passing the switching point of the reed switch 23, to thus ensure high reliability of subsequent air/fuel ratio control.

Additional Functions

The additional function block in FIG. 2 performs various functions of controlling the operations of various emission control devices provided in combination with the engine, such as EGR valve 70, secondary air valve 60, shot air valve 27 and valve 54, in response to the operating condition of the engine.

Details of the control of these emission control devices will now be described.

(1) As for the exhaust gas recirculation valve (EGR valve) 70, it was previously stated that the above valve 70 is closed to interrupt exhaust gas recirculation at engine low load or at engine low temperature for prevention of combustion instability. The condition of interruption of exhaust gas recirculation is met when the absolute pressure $P_B$ in the intake manifold is lower than a predetermined value $P_{BE}$ or when the engine coolant temperature Tw is lower than a predetermined temperature $T_{WE}$. When either the relationship $P_B < P_{BE}$ or $T_W < T_{WE}$ stands, ECU 20 interrupts energization of the solenoid of the control solenoid valve (EGR control valve) 75 to interrupt the operation of the EGR valve 70.

In a conventional exhaust gas recirculation system, there were provided an intake manifold negative pressure sensor having an atmospheric pressure compensating bellows and a temperature sensor, which are independently provided for the respective exclusive purposes of detecting a low load condition of the engine and the temperature of the engine. While in the air/fuel ratio control system of the invention, the pressure sensor 76 and the coolant temperature sensor 59 formed of a thermistor which are used in the arrangement of FIG. 1 for air/fuel ratio control can also directly be used for the control of interruption of exhaust gas recirculation, to thus dispense with provision of special sensors as mentioned above.

(2) The secondary air valve 60, which serves to create an oxidizing atmosphere in the interior of the three-way catalyst 69 for efficient purification of HC, CO ingredients in the exhaust gas as previously noted, needs to be held inoperative during air/fuel ratio feedback control for the reason previously mentioned. To this end, according to the invention, the secondary air valve 60 is operated in synchronism with the open loop control operations so as to avoid concurrence of the operation of the valve with the closed loop control operation. More specifically, the secondary air valve 60 is operated when there is fulfillment of any one of the conditions of open loop control operations at engine idle, at engine deceleration, at non-activation of the $O_2$ sensor and at engine low temperature (before warming-up of the engine). To this end, ECU 20 energizes the control solenoid valve 63 to actuate the secondary air valve 60 when any one of the following conditions a-c is fulfilled:

a. The aforementioned timer has not finished counting as yet, which is triggered by an activation signal from the $O_2$ sensor 69 to start counting for one minute for instance, or the engine coolant temperature $T_W$ is lower than a predetermined value (e.g., 35° C.).
b. The engine rpm Ne is lower than a predetermined value (e.g., 1,000 rpm).
c. The absolute pressure $P_B$ in the intake manifold is lower than a predetermined value (e.g., 200 mmHg), that is, the negative pressure in the intake manifold is larger than the predetermined value.

Operation of the secondary air valve 60 at filfillment of any one of the above requirements a, b, c will bring about the following results:

(i) The condition a corresponds to prewarming-up condition of the engine. Under such condition, CO, HC ingredients are present in large quantities in the exhaust gas. Purification of these ingredients can be effectively carried out by the three-way catalyst 69 due to operation of the valve 60.
(ii) The condition b corresponds to idling condition of the engine where NOx is present in small quantities in the exhaust gas. Purification of CO and unburned HC ingredients which are produced at engine idle is made by the three-way catalyst 69 due to operation of the valve 60.
(iii) The condition c corresponds to decelerated condition of the engine where $NO_x$ is present in small quantities in the exhaust gases. Purification of CO and unburned HC which are produced at engine deceleration is effected by the three-way catalyst due to operation of the valve 30.

The above values Tw, Ne, $P_B$ are detected, respectively, by the engine cooling temperature sensor 59, rpm sensor 78, 79 and pressure sensor 76, all shown in FIG. 1.

(3) The shot air valve 27 is temporarily held inoperative at the start of the engine by means of the solenoid valve 38 for prevention of misfire in an engine cylinder due to sudden dilution of the suction mixture with air.

This shot air valve 27 is kept inoperative for a predetermined period of time (e.g., 5 seconds) after first firing of the engine. It is judged that first firing of the engine occurs when the engine rpm Ne has exceeded the predetermined value $N_{CR}$. ECU 20 contains a timer for performing five second counting. When the rpm Ne detected by the rpm sensor 78, 79 has exceeded the predetermined value $N_{CR}$, the above timer starts counting, and during five second counting by the timer after the start of the counting operation, the solenoid valve 38 is operated by ECU 20 to keep the shot air valve 27 inoperative.

(4) Lastly, reference is made to the temporary suspension of fuel feed to the venturi of the carburetor 3 from the canister 48 (purge cut) which was previously referred to in the description of the arrangement of FIG. 1. This temporary fuel feed suspension is effected on condition that the coolant temperature $T_W$ is lower than a predetermined value $T_{WP}$. More specifically, before the engine temperature $T_W$ reaches the predetermined value $T_{WP}$ during engine warming-up operation immediately after the start of the engine, ECU 20 energizes the solenoid valve 53 to cause introduction of atmospheric pressure into the pressure chamber 54a of the valve 54 at the upper portion of the canister 48 to close the valve 54 to thereby suspend feeding of absorbed fuel vapor to the venturi from the canister 48. When the engine temperature exceeds the predetermined value, ECU 20 deenergizes the solenoid valve 53 to initiate feeding of absorbed fuel vapor to the venturi from the canister 48.

Fail Safe and Alarm Diagnosis Functions

To ensure safe and positive engine operation, the air/fuel ratio control system according to the invention is provided with various fail safe functions of detecting troubles occurring in various sensors, switches, valves and ECU which form the control system, and stopping the pulse motor or moving it to predetermined positions, as well as alarm functions of alarming upon occurrence of troubles and memory functions of storing information on the troubles (Block D in FIG. 2). Of the various fail safe functions, reference is now made only to the fail safe function applied to the troubles in the reed switch 23 for detecting the reference position of the pulse motor 13.

When the power source is turned on, ECU 20 determines the rotational direction of the pulse motor 13 in response to the level of a binary signal produced by the reed switch 23 and drives the pulse motor 13 in the direction thus determined until the reference position is reached. However, there is a possibility that the output signal of the reed switch 23 does not change even when the pulse motor 13 passes the switching point of the reed switch 23 due to vibrations of parts surrounding the reed switch 23, for instance. According to the invention, when the power source is turned on, the pulse motor 13 is driven through its whole stroke several times over. If there is no change in the output signal of the reed switch 23 even after the above driving of the pulse motor, it is assumed that abnormalities exist in the reed switch system, and the pulse motor 13 is moved to its extreme position at which a minimum air/fuel ratio (i.e., a maximum fuel ratio) is obtained, is further moved from this extreme position to the atmospheric pressure-compensated predetermined idle position $PS_{IDL}(P_A)$ and held there. At the same time, suitable operations of alarming, storing and displaying the contents of the trouble concerned are carried.

By so setting the pulse motor 13 to the atmospheric pressure-compensated position $PS_{IDL}(P_A)$ when the reference position detecting circuit for the pulse motor is at fault, a certain air/fuel ratio (e.g., 14.7) is positively obtained to thereby keep to a minimum the influence of the trouble upon vehicle driveability during subsequent engine operation.

The concrete routines for carrying out the above-mentioned various functions of the air/fuel ratio control system according to the invention will now be described with reference to FIGS. 3 through 8.

A. Initialization Routine (1) Initialization of ECU

Figure 3:
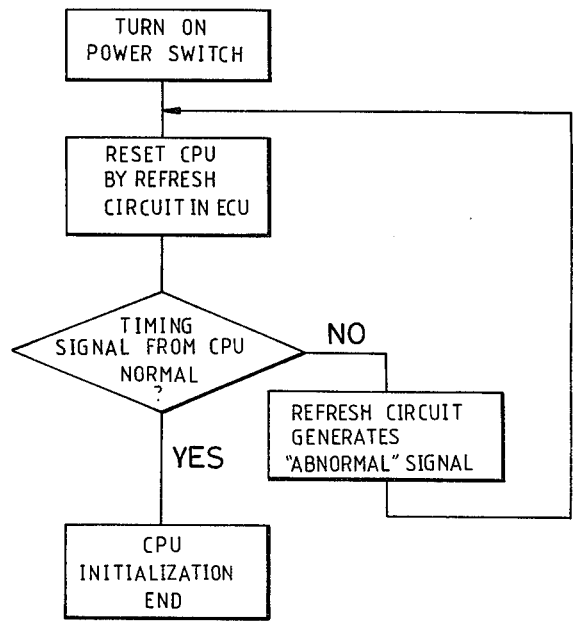
FIG. 3 is a flow diagram of the initialization routine of an electronic control unit used in the system of the invention.

Referring first to FIG. 3 illustrating the initialization method of ECU 20, when the power switch (the ignition switch 80 in FIG. 2) is set on, a refresh circuit provided in ECU 20 correspondingly turns on the central processing unit (CPU) in ECU 20. Accordingly, CPU produces a timing signal representing completion of the initialization of CPU. A determination is made in ECU as to whether or not this timing signal is correct. If the signal is correct, it is regarded that the initialization of CPU has been completed, and the program proceeds to execution of subsequent functions to be described later. If the timing signal is determined to be incorrect, CPU is again turned on. This cycle of operation is repeated until a correct timing signal is obtained from CPU.

(2) Setting of Actuator (Pulse Motor) to Initial Position

Upon completion of the above initialization of ECU, the program proceeds to setting of the actuator for the air/fuel ratio control valve 9 or pulse motor 13 to the predetermined position $PS_{CR}$. Here, also described will be the procedure of execution of the fail safe function of the reed switch 23 for detecting the position of the pulse motor 13, previously referred to, by reference to FIGS. 4 and 5. As previously mentioned, in setting the initial position of the pulse motor 13, if the reference position of the pulse motor cannot be detected, the pulse motor is repeatedly driven through the whole stroke several times over. To this end, the counted value of a reversing time counter provided in ECU, which counts the number of times of reversal of the driving direction of the pulse motor, is set at 1 (Step 1 in FIG. 4). Then, it is determined whether the output signal of the reed switch 23 is high (Hi) or low (Lo) at the step 2. If the output signal is Hi, the pulse motor 13 is moved down by 1 step at the step 3, followed by again determining whether the above output signal is Hi or Lo at the step 4. If the output signal is Lo, the program proceeds to the step 9 to be described later. On the other hand, if the above output signal remains Hi, it is determined whether or not the pulse motor has been driven over the steps corresponding to the whole stroke, namely, 120 steps, at the step 5. If the answer is "NO", the program returns to the step 3 to repeat the steps 3 and 4 of determining the reed switch output signal and driving down the pulse motor by 1 step until the driving-down steps reach 120 steps. When the number of steps thus reduced reaches 120, 1 is added to the counted value N=1 in the reversing time counter at the step 6. Then, it is determined whether or not the number of reversing times exceeds 3 at the step 7. If the number of reversing times is less than 3, the pulse motor is driven in the opposite or step-increasing direction until 120 steps are counted up, at the step 8. The above steps 3-7 are repeated until the number of reversing times exceeds 3.

When the steps 3-7 have been repeated over three times (that is, the answer at the step 7 is "YES"), the pulse motor is driven to the atmospheric pressure-compensated predetermined position $PS_{IDL}(P_A)$ on the assumption that the reed switch 23 is at fault, and held there, and simultaneously the alarm is given and information on the trouble is stored into a memory provided in ECU (step 18).

On the otherhand, if the determination at the step 2 shows that the output signal of the reed switch 23 is Lo, the pulse motor is driven up by 1 step at the step 9, and then whether or not the reed switch output signal is Hi or Lo is determined at the step 10. If the output signal remains Lo, a determination is made as to whether or not the number of steps thus increased has exceeded 120 corresponding to the number of steps through the whole stroke, at the step 11. If the answer is "NO", the step 9 is resumed, and then the above operations of determination of the level of the reed switch output signal and driving up the pulse motor by 1 step are repeated until the number of increased steps exceeds 120. When the number of increased steps reaches 120, the pulse motor is immediately driven in the reverse or step-decreasing direction until 120 steps are counted up at the step 12. Upon completion of this stroke of driving, 1 is added to the counted value N=1 of the reversing time counter at the step 13. Then, it is determined whether or not the number of reversing times has exceeded 3 at the step 14. If the answer is "NO", the operations at the steps 9-14 are repeated until the number of reversing times exceeds 3. At the step 14, if the answer is "YES", the program returns to the step 18 where the aforementioned operations are carried out.

On the other hand, if as a result of the comparison at the step 10 the output signal of the reed switch is Hi, the operation of detecting the reference position of the pulse motor is interrupted at the step 15 on the assumption that the pulse motor has reached the reference position, and simultaneously the reference position, e.g., the number of 50 steps is stored into a position counter provided in ECU, which stores the position of the pulse motor, at the step 16. Thereafter, the pulse motor is driven to the atmospheric pressure-compensated predetermined position $PS_{CR}(P_A)$, terminating the initialization operation of the pulse motor.

FIG. 5 illustrates the manner of shifting the position of the pulse motor during the above-mentioned initial position setting operation. In FIG. 5, parts (A) and (B) illustrate, respectively, cases where the pulse motor original or starting position is at a step larger than the reference position (50th step) and at a step smaller than the same reference position.

In FIG. 5 (A), (B), section i shows a case where the reed switch is correctly operating, while section ii a case where the reed switch is at fault, making it impossible to detect the position of the pulse motor. In section i of part (A) of FIG. 5, it is noted that the pulse motor is turned not at the reference position (50th step) but at point a. This is because of a hysteresis between the closing position and opening position of the reed switch, which is equivalent to five steps, for instance. In the illustrated example, only when the output signal of the reed switch changes from Hi to Lo, the switching timing of the reed switch is retarded with respect to the traversing timing of the pulse motor across the reference position. Therefore, the reed switch output signal is not used as a reference position signal when the reed switch output signal changes from Hi to Lo on the assumption that the pulse motor position is actually at a position smaller by a predetermined number of steps (5 steps) than the reference position. On the contrary, when the reed switch output signal changes from Lo to Hi, this output signal is used as a reference position signal, on the assumption that the pulse motor is then at the reference position. In parts (A), (B) of FIG. 5, symbols b, b' show that at the start of the engine, usually the pulse motor is not located at the upper or lower extreme position but at an intermediate position so that in the event of occurrence of abnormalities in the reed switch the pulse motor is driven from the intermediate position until 120 steps are counted up, to be mechanically held at the upper or lower extreme position until after it has been supplied with a number of driving pulses corresponding to 120 steps.

(3) Detection of Initiation Timing of Air/Fuel Ratio Control

Figure 6:
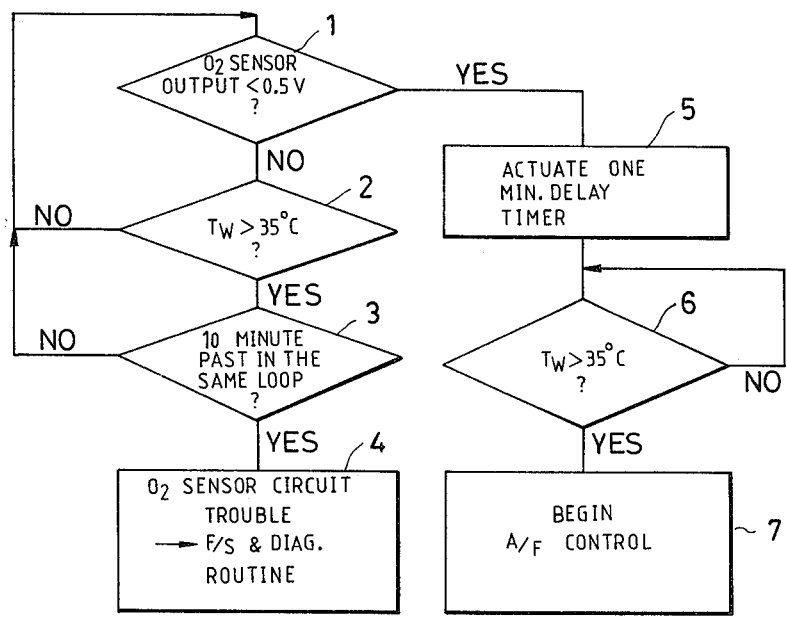
FIG. 6 is a flow diagram of the detection of the initiating condition of air/fuel ratio control according to the invention.
Figure 4:
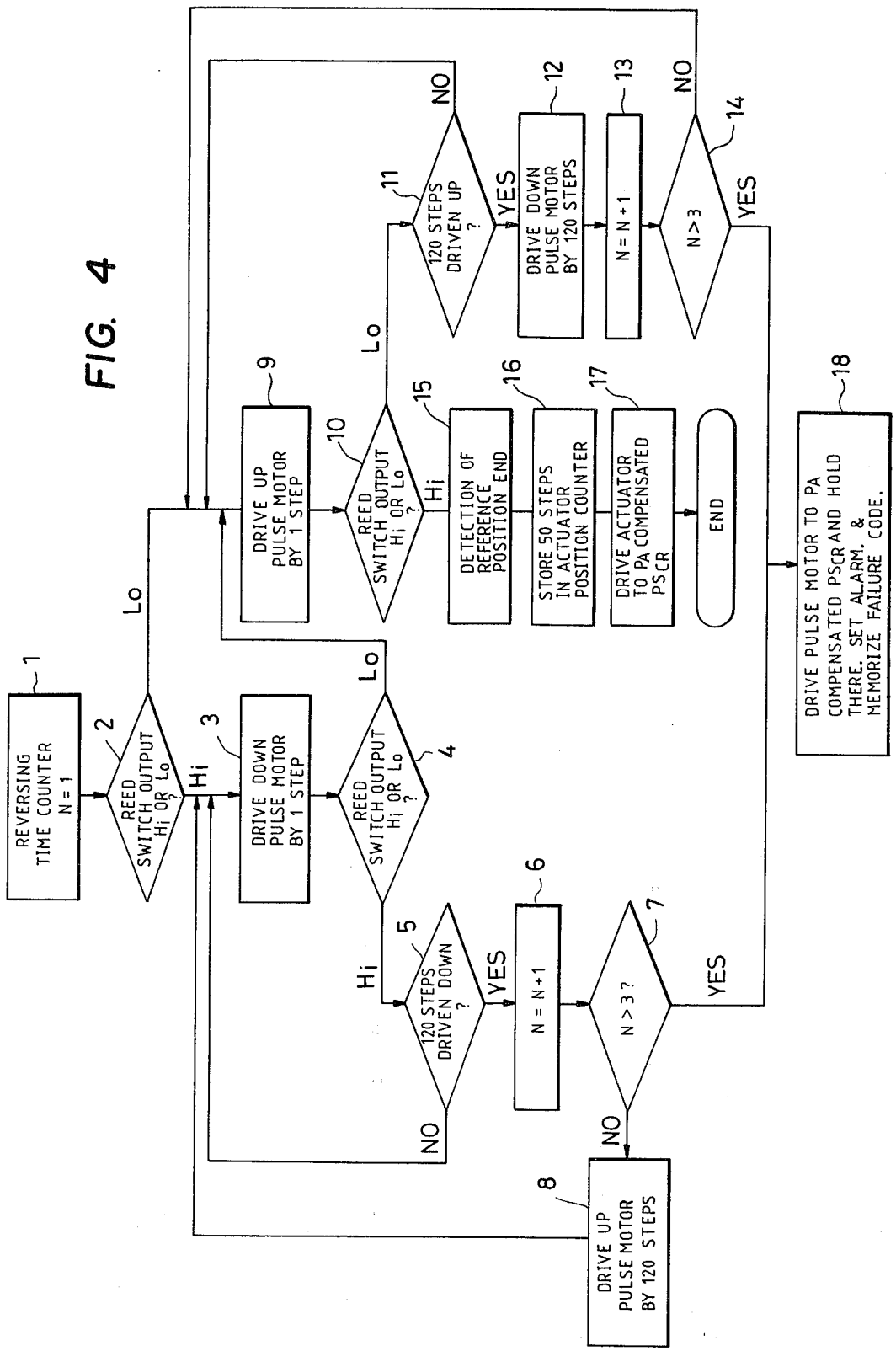
FIG. 4 is a flow diagram of the initialization routine of the pulse motor used in the system of the invention.

Simultaneously with the above setting of the pulse motor to the initial position, the initiation timing of air/fuel ratio control is detected, based upon the activation condition of the O₂ sensor and the engine coolant temperature. FIG. 6 is a flow diagram illustrating the programming for detection of such timing. First, it is determined whether or not the output voltage of the $O_2$ sensor has lowered below a predetermined voltage Vx (e.g., 0.5 volts) and whether or not the coolant temperature Tw has exceeded the predetermined value Twx (e.g., 35° C.) at the steps 1, 2, respectively. If the output voltage of the $O_2$ sensor has not yet dropped below the predetermined value Vx and the coolant temperature is still lower than 35° C., the above determinations are repeated several times until the answer "YES" is obtained, at the steps 1, 2. During this repeated operation, if the coolant temperature Tw exceeds the value Twx, a determination is made as to whether or not the above repeated determination operation at the step 1 has been continued over ten minutes at the step 3. If the answer is "YES", a predetermined fail safe diagnosis function is executed at the step 4, on the assumption that the $O_2$ sensor circuit is at fault.

On the other hand, if at the step 1 it has been determined that the output voltage of the $O_2$ sensor has dropped below the predetermined value Vx (0.5 volts), a related timer provided in ECU is actuated to produce a timer output after a lapse of the predetermined period of time tx (e.g., one minute), at the step 5. On this occasion, it is determined whether or not the coolant temperature Tw is higher than the predetermined value Twx (35° C.), at the step 6. If the answer is "YES", the air/fuel ratio control is initiated at the step 7. If the answer is "NO" at the step 6, initiation of the air/fuel ratio control is suspended until after the coolant temperature Tw has exceeded the predetermined value (35° C.).

B. Basic Air/Fuel Ratio Control Routine

Figure 7:
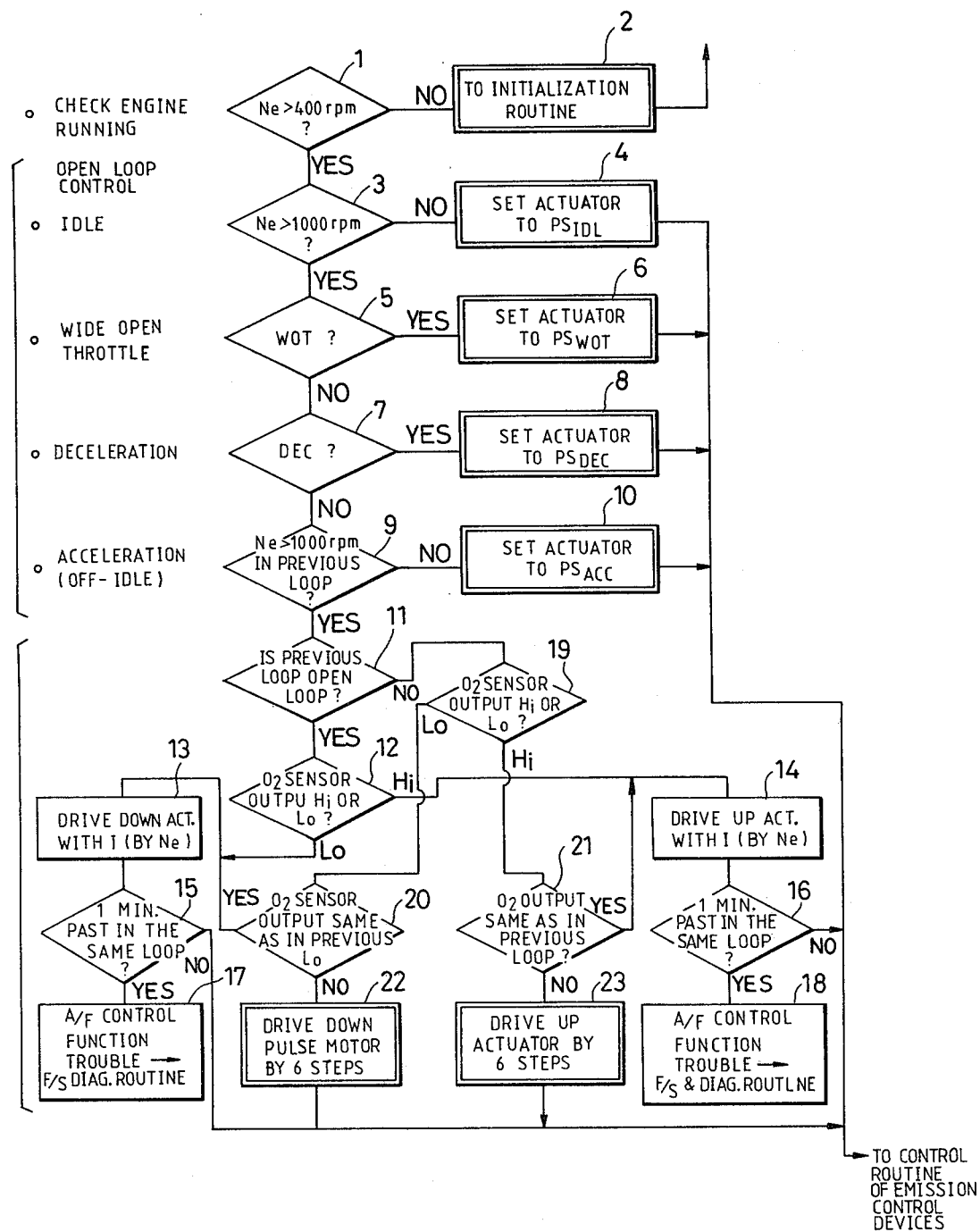
FIG. 7 is a flow diagram of the basic air/fuel ratio control routine according to the invention.

FIG. 7 is a flow diagram of the programming of the basic air/fuel ratio control according to the present invention.

Referring first to the basic air/fuel ratio control in open loop mode, it is determined at the start of the control operation whether or not the actual engine rpm Ne has exceeded the predetermined value $N_{CR}$ (e.g., 400 rpm) at the step 1. If the answer is "NO", the aforementioned initialization routine is resumed at the step 2. If the answer is "YES", it is determined whether or not the engine is idling, that is, whether or not the engine rpm Ne has exceeded the predetermined idle rpm $N_{IDL}$ (e.g., 1,000 rpm), at the step 3. If the engine rpm Ne is still lower than the idle rpm, the pulse motor is set to the predetermined idle position $PS_{IDL}$, at the step 4. On the other hand, if the idle rpm has been exceeded, it is determined at the step 5 whether or not the throttle valve in the intake manifold is at its wide-open position. If it is at the wide-open position, the pulse motor is set to the predetermined wide-open-throttle control position $PS_{WOT}$, at the step 6. If the throttle valve is not at the wide-open position, it is determined whether or not the engine is decelerating, at the step 7. If the engine is decelerating, the pulse motor is set to the predetermined deceleration control position $PS_{DEC}$ at the step 8. If the engine is not decelerating, it is determined whether or not the engine rpm in the previous loop has exceeded the predetermined idle rpm (1,000 rpm), at the step 9. If this predetermined value has not yet been exceeded, the pulse motor is set to the predetermined acceleration control position $PS_{ACC}$, at the step 10.

Reference is now made to the control procedure of air/fuel ratio control in closed loop mode. If at the above step 9 it has been determined that the engine rpm Ne in the previous loop exceeded the predetermined idle rpm, a determination is made as to whether or not the previous loop was an open loop or a closed loop, at the step 11. If the previous loop was an open loop, closed loop control is initiated with integral term (I term) correction. In this event, it is determined at the step 12 whether or not the output signal of the $O_2$ sensor is Lo or Hi. The pulse motor is driven in the step-decreasing direction or in the step-increasing direction with integral term correction at a rate corresponding to the engine rpm Ne, depending upon whether the output signal of the $O_2$ sensor is Lo or Hi, at the steps 13, 14, respectively. If even after the above driving of the pulse motor there is no change in the output signal of the $O_2$ sensor between Lo and Hi over a predetermined period of time, one minute for instance (determined at the steps 15, 16), the program proceeds to fail safe diagnosis functions at the steps 17, 18.

On the other hand, if at the above step 11 it has been judged that the previous loop was a closed loop, it is determined whether or not the output signal of the $O_2$ sensor is Lo or Hi at the step 19. Comparison is made as to whether or not the output signal thus determined is at the same level as in the previous loop, at the steps 20, 21. If at the same level, the above-mentioned I-term control steps 13, 15, 17, 14, 16, 18 are executed. If not at the same level, the pulse motor is driven with proportional term (P term) correction at the steps 22, 23.

C. Routine of Control of Emission Control Devices

Figure 8:
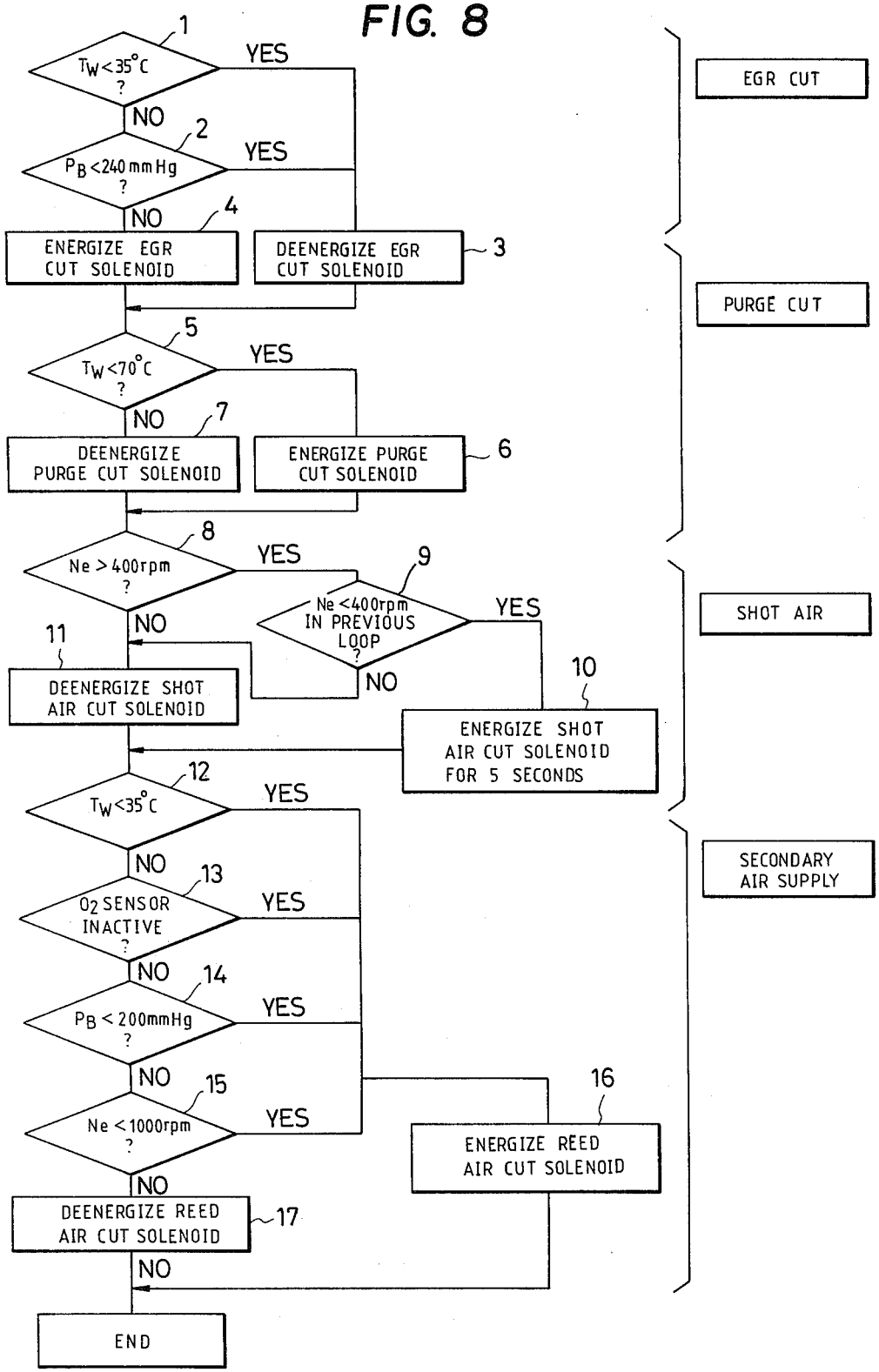
FIG. 8 is a flow diagram of the control routine of emission control devices used in the system of the invention.

Control of various emission control devices for the engine is carried out in connection with the aforementioned control under items A, B. FIG. 8 illustrates the control routines of EGR control valve 75, purge cut valve 53, shot air cut valve 38, and reed air cut valve 63, all the valves being previously described with reference to FIG. 1.

At the start of the engine, the EGR control valve 75 and the purge cut valve 53 have their solenoids deenergized and energized, respectively, to keep their respective controlling valves 70, 54 inoperative. Simultaneously, the shot air cut valve 38 has its solenoid deenergized to temporarily render the shot air valve 27 ready to operate. The reed air cut valve 63 has its solenoid energized to render the secondary air valve 60 ready to operate. First, at the step 1 in FIG. 8, it is determined whether or not the engine coolant temperature Tw is lower than a predetermined value $Tw_E$ (35° C.). If the answer is "YES", the solenoid of the EGR control valve 75 is kept deenergized at the step 3 to keep the EGR valve 70 from carrying out the exhaust gas recirculation. If the answer is "NO", a determination is made as to whether or not the pressure value detected by the pressure sensor 76 is lower than a predetermined value $P_{BE}$ (240 mmHg) at the step 2. If the former is lower than the latter, the solenoid of the above valve 75 is kept deenergized. On the other hand, when the engine coolant temperature has increased above 35° C. and simultaneously the pressure detected by the pressure sensor 76 has risen above the predetermined value $P_{BE}$, the EGR control valve 75 has its solenoid energized at the step 4. Then, it is determined whether or not the coolant temperature Tw is lower than a predetermined value Twp (70° C.) at the step 5. If the former has not increased up to 70° C., the purge cut valve 53 still has its solenoid kept energized to still suspend the feed of fuel from the canister to the venturi of the carburetor, at the step 6. When the coolant temperature then increases above 70° C., the purge cut valve 53 has its solenoid deenergized at the step 7. It is determined whether or not the engine rpm Ne is higher than a predetermined value $N_{CR}$ (400 rpm) which forms the condition of shot air cut, at the step 8. If the answer is "YES", a further determination is made as to whether or not the engine rpm Ne in the previous loop was smaller than the above predetermined value $N_{CR}$, at the step 9. If the answer is "YES", that is, the engine has reached a first firing condition, the shot air cut valve 38 has its solenoid energized for a predetermined period of time (e.g., 5 seconds) to keep the shot air valve 27 inoperative, at the step 10. On the other hand, when the engine rpm Ne in the present loop is lower than the predetermined value $N_{CR}$ or the engine rpm Ne in the previous loop was larger than the same predetermined value $N_{CR}$, the shot air cut valve 38 has its solenoid deenergized at the step 11 to render the shot air valve 27 operative.

As for the control of the secondary air valve 60, each determination is made as to whether or not the coolant temperature Tw is lower than 35° C. (step 12), whether or not the O₂ sensor is inactive (step 13), whether or not the detected pressure $P_B$ is lower than 200 mmHg (step 14) and whether or not the engine rpm Ne is smaller than 1,000 rpm (step 15). These determinations are made in the above-mentioned order and on condition that the result of the determination at each preceding step is "NO". If any one of these determinations provides the answer of "YES", the reed air cut valve 63 has its solenoid energized to render the secondary air valve 60 operative, at the step 16. When the determinations at all the above the provide the answer of "NO", the reed air cut valve 63 has its solenoid deenergized at the step 17 to render the secondary air valve 60 inoperative.

Figure 9:
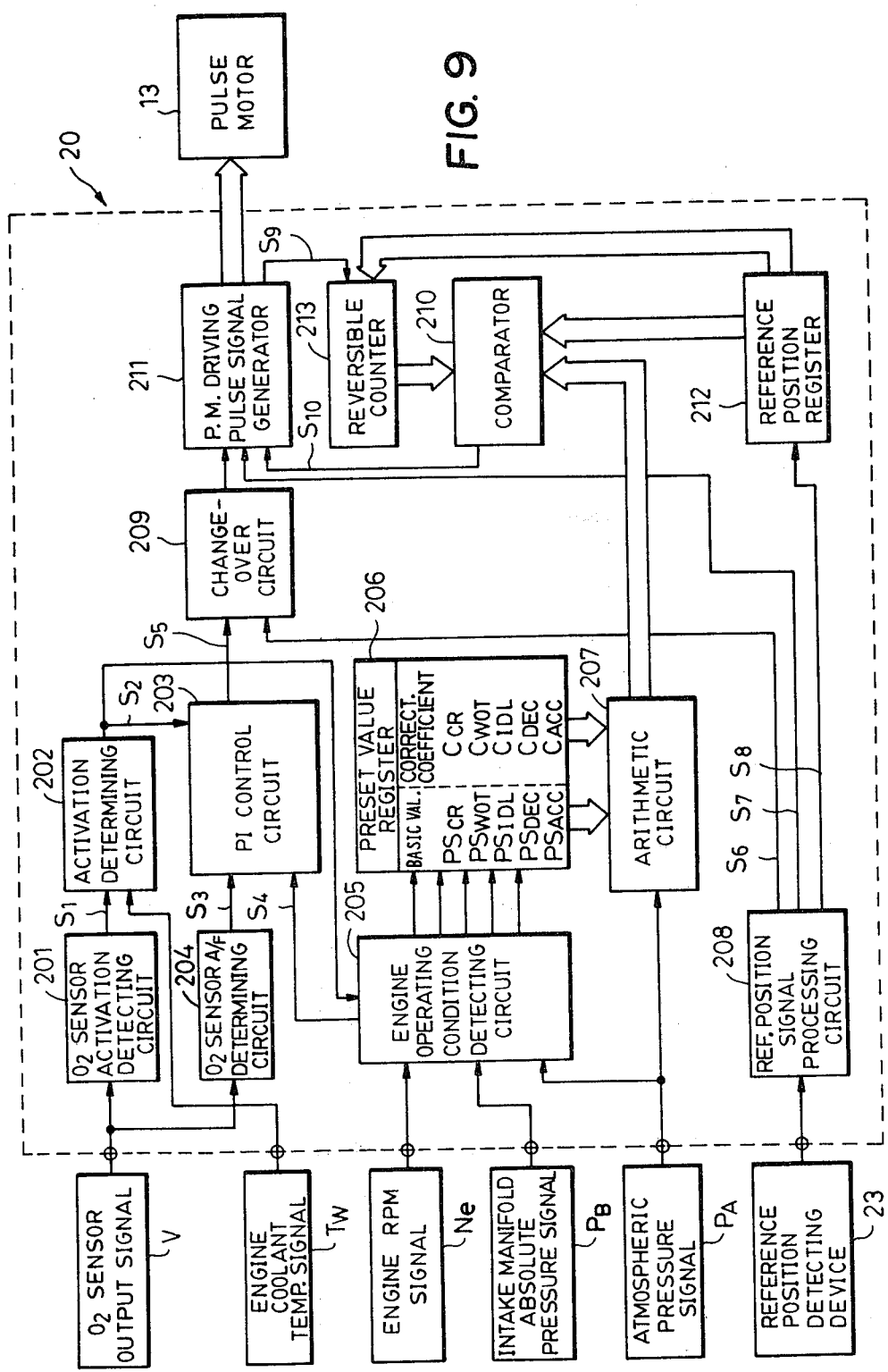
FIG. 9 is a block diagram of the whole construction of the electrical circuit in the electronic control unit.

FIG. 9 is a block diagram illustrating the interior construction of ECU 20 used in the air/fuel ratio control system having the above-mentioned functions according to the invention. In ECU 20, reference numeral 201 designates a circuit for detecting the activation of the O₂ sensor, which is supplied at its input with an output signal V from the O₂ sensor. Upon passage of the predetermined period of time Tx after the voltage of the above output signal V has dropped below the predetermined value Vx, the above circuit 201 supplies an activation signal $S_1$ to an activation determining circuit 202. This activation determining circuit 202 is also supplied at its input with an engine coolant temperature signal Tw from the thermistor 59 in FIG. 1. When supplied with both the above activation signal $S_1$ and the coolant temperature signal Tw indicative of a value exceeding the predetermined value Twx, the activation determining circuit 202 supplies an air/fuel ratio control initiation signal $S_2$ to a PI control circuit 203 to render same ready to operate. Reference numeral 204 represents an air/fuel ratio determining circuit which determines the value of air/fuel ratio of engine exhaust gas, depending upon whether or not the output voltage of the O₂ sensor is larger than the predetermined value Vref, to supply a binary signal $S_3$ indicative of the value of air/fuel ratio thus obtained, to the PI control circuit 203. On the other hand, an engine condition detecting circuit 205 is provided in ECU 20, which is supplied with an engine rpm signal Ne from the engine rpm sensor 78, 79, an absolute pressure signal $P_B$ from the pressure sensor 76, an atmospheric pressure sensor 82 from the atmospheric pressure sensor 82, all the sensors being shown in FIG. 1, and the above control initiation signal $S_2$ from the activation determining circuit 202 in FIG. 9, respectively. The circuit 205 supplies a control signal $S_4$ indicative of a value corresponding to the values of the above input signals to the PI control circuit 203. The PI control circuit 203 accordingly supplies to a change-over circuit 209 to be referred to later a pulse motor control signal $S_5$ having a value corresponding to the air/fuel ratio signal $S_3$ from the air/fuel ratio determining circuit 204 and a signal component corresponding to the engine rpm Ne in the control signal $S_4$ supplied from the engine condition detecting circuit 205. The engine condition detecting circuit 205 also supplies to the PI control circuit 203 the above control signal $S_4$ containing a signal component corresponding to the engine rpm Ne, the absolute pressure $P_B$ in the intake manifold, atmospheric pressure $P_A$ and the value of air/fuel ratio control initiation signal $S_2$. When supplied with the above signal component from the engine condition detecting circuit 205, the PI control circuit 203 interrupts its own operation. Upon interruption of the supply of the above signal component to the control circuit 203, a pulse signal $S_5$ is outputted from the circuit 203 to the change-over circuit 209, which signal starts air/fuel ratio control with integral term correction. A preset value register 206 is provided in ECU 20, in which are stored the basic values of preset values $PS_{CR}$, $PS_{WOT}$, $PS_{IDL}$, $PS_{DEC}$ and $PS_{ACC}$ for the pulse motor position, applicable to various engine conditions, and atmospheric pressure correcting coefficients $C_{CR}$, $C_{WOT}$, $C_{IDL}$, $C_{DEC}$ and $C_{ACC}$ for these basic values. The engine condition detecting circuit 205 detects the operating condition of the engine based upon the activation of the O₂ sensor and the values of engine rpm Ne, intake manifold absolute pressure $P_B$ and atmospheric pressure $P_A$ to read from the register 206 the basic value of a preset value corresponding to the detected operating condition of the engine and its corresponding correcting coefficient and apply same to an arithmetic circuit 207. The arithmetic circuit 207 performs arithmetic operation responsive to the value of the atmospheric pressure signal $P_A$, using the equation $PSi(P_A) = PSi + (760 - P_A) \times Ci$. The resulting preset value is applied to a comparator 210.

On the other hand, a reference position signal processing circuit 208 is provided in ECU 20, which is responsive to the output signal of the reference position detecting device (reed switch) 23, indicative of the switching of same, to produce a binary signal $S_6$ having a certain level from the start of the engine until it is detected that the pulse motor reaches the reference position. This binary signal $S_6$ is supplied to the change-over circuit 209 which in turn keeps the control signal $S_5$ from being transmitted from the PI control circuit 203 to a pulse motor driving signal generator 211 as long as it is supplied with this binary signal $S_6$, thus avoiding the interference of the operation of setting the pulse motor to the initial position with the operation of P-term/I-term control. The reference position signal processing circuit 208 also produces a pulse signal $S_7$ in response to the output signal of the reference position detecting device 23, which signal causes the pulse motor 13 to be driven in the step-increasing direction or in the step-decreasing direction so as to detect the reference position of the pulse motor 13. This signal $S_7$ is supplied directly to the pulse motor driving signal generator 211 to cause same to drive the pulse motor 13 until the reference position is detected. The reference position signal processing circuit 208 produces another pulse signal $S_8$ each time the reference position is detected. This pulse signal $S_8$ is supplied to a reference position register 212 in which the value of the reference position (e.g., 50 steps) is stored. This register 212 is responsive to the above signal $S_8$ to apply its stored value to one input terminal of the comparator 210 and to the input of a reversible counter 213. The reversible counter 213 is also supplied with an output pulse signal $S_9$ produced by the pulse motor driving signal generator 211 to count the pulses of the signal $S_9$ corresponding to the actual position of the pulse motor 13. When supplied with the stored value from the reference position register 212, the counter 213 has its counted value replaced by the value of the reference position of the pulse motor.

The counted value thus renewed is applied to the other input terminal of the comparator 210. Since the comparator 210 has its other input terminal supplied with the same pulse motor reference position value, as noted above, no output signal is supplied from the comparator 210 to the pulse motor driving signal generator 211 to thereby hold the pulse motor at the reference position with certainty. Subsequently, when the $O_2$ sensor 68 remains deactivated, an atmospheric pressure-compensated preset value $PS_{CR}(P_A)$ is outputted from the arithmetic circuit 207 to the one input terminal of the comparator 210 which in turn supplies an output signal $S_{10}$ corresponding to the difference between the preset value $PS_{CR}(P_A)$ and a counted value supplied from the reversible counter 213, to the pulse motor driving signal generator 211, to thereby achieve accurate control of the position of the pulse motor 13. Also, when the other open loop control conditions are detected by the engine condition detecting circuit 205, similar operations to that just mentioned above are carried out.

Figure 10:
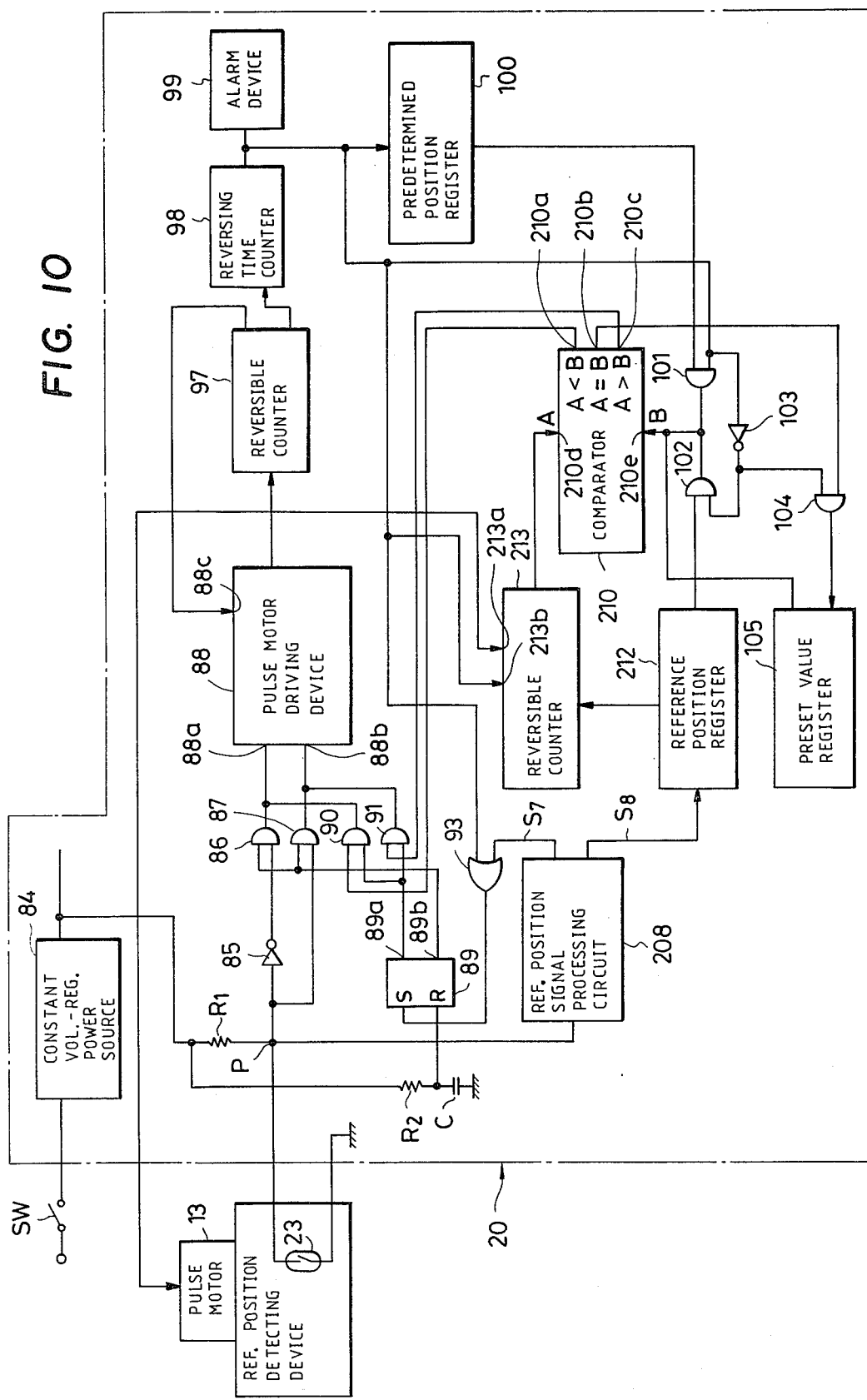
FIG. 10 is a circuit diagram of an electrical circuit for setting the initial pulse motor position, used in the electronic control unit.

FIG. 10 illustrates in detail an electrical circuit for performing the operation of setting the pulse motor at its initial position, which is provided in ECU 20. A power switch SW (e.g., the ignition switch 80 in FIG. 1) is connected to the reed switch 23 forming part of the reference position detecting device for the pulse motor 13, by way of a constant voltage-regulated power source 84 and a resistance $R_1$ so that the output potential at the junction P of the switch 23 with the resistance $R_1$ changes from a high level H to a low level L or vice versa in response to the switching action of the reed switch 23. AND circuits 86, 87 are connected at their one input terminals to the junction P, respectively, by way of an inverter 85 and directly, and also connected at their outputs to the input terminals 88a, 88b of a pulse motor driving device 88, respectively. The other input terminals of the AND circuits 86, 87 are connected to an output terminal 89b of a flip flop 89. The flip flop 89 is connected at its R-input terminal to the junction of a resistance $R_2$ with a capacitor C, the resistance $R_2$ and the capacitor C being serially connected between the constant voltage-regulated power source 84 and the ground. The other output terminal 89a of the flip flop 89 is connected to input terminals of AND circuits 90, 91 which are connected at their outputs, respectively, to the input terminals 88a, 88b of the pulse motor driving device 88. On the other hand, the reference position signal processing circuit 208 in FIG. 9, which produces a signal each time the pulse motor 13 passes the reference position (e.g., 50th step), is connected at its input to the above junction P and at its output for the pulse signal $S_7$ to the S-input terminal of the flip flop 89 by way of an OR circuit 93, respectively. The reference position signal processing circuit 208 has its output for the pulse signal $S_8$ connected to the input of the reference position register 212 in FIG. 9 storing the reference position value (e.g., 50 steps) of the pulse motor 13, which register 212 has its one output terminal connected to one input terminal of the reversible counter 213 in FIG. 9. This reversible counter 213 is supplied at its input terminals 213a, 213b, respectively, with the output signal of the pulse motor driving device 88 and the output signal of a reversing time counter 98 which counts the number of times of reversal of the rotating direction of the pulse motor 13 to count the pulses of these output signals corresponding to the actual position of the pulse motor 13. The reversible counter 213 has its output connected to one input terminal 210d of the comparator 210.

On the other hand, the pulse motor driving device 88 is connected at its output to the pulse motor 13 and the input of the reversible counter 97 which is connected at its output to the input of the reversing time counter 98 and the reversal signal input terminal 88c of the driving device 88, respectively. The reversing time counter 98 has its output connected to the inputs of an alarm device 99 and a register 100. The output of the reversing time counter 98 is further connected to the other input terminal of the aforementioned OR circuit 93 and the input terminal 213b of the reversible counter 213.

The register 100 is connected at its output to one input terminal of an AND circuit 101 which has its other input terminal connected to the output of the reversing time counter 98. The AND circuit 101 has its output connected to the output of another AND circuit 102, the junction of the two outputs being connected to the other input terminal 210e of the comparator 210. The AND circuit 102 has its one input terminal arranged to be supplied with the output signal of the register 212 and its other input terminal with the output signal of the reversing time counter 98 by way of an inverter 103, respectively. The comparator 210 has three output terminals 210a, 210b, 210c. Provided that the number of output pulses of the reversible counter 213 applied to one input terminal 210d of the comparator 210 is designated by A, and the number of output pulses of the AND circuits 101, 102 applied to the other input terminal 210e of same by B, respectively, the respective output signals are outputted through the output terminal 210a when the relationship $A<B$ stands, through the output terminal 210b when the relationship $A=B$ stands, and through the output terminal 210c when the relationship $A>B$ stands, respectively. The output terminals 210a, 210c of the comparator 210 are connected to the respective other input terminals of the AND circuits 90, 91, while the output terminal 210b is connected to one input terminal of another AND circuit 104. This AND circuit 104 has its other input terminal connected to the output of the inverter 103, and its output to the input of a register 105 in which a value corresponding to the predetermined initial position for the pulse motor 13 is stored, respectively. The register 105 in turn has its output connected to the other input terminal 210e of the comparator 210.

The operation of the initial position setting circuit arrangement for the pulse motor 13 mentioned above will now be described. In FIG. 10, upon turning on the power switch SW, the potential at the junction of the resistance $R_2$ with the capacitor C increases to cause the flip flop 89 to produce a high level signal "1" at its output terminal 89b which signal is applied to each one input terminal of the AND circuits 86, 87. Incidentally, the flip flop 89 is adapted to produce, when resetted, a high level signal "1" at its output terminal 89b. On this occasion, if the pulse motor 13 is positioned on the lean side (large air/fuel ratio) side of the stoichiometric air/fuel ratio with the reed switch 23 off, the potential at the junction P is at the high level "1" so that the output of the AND circuit 86 is "0" and that of the AND circuit 87 is "1". This high output "1" of the AND circuit 87 is applied to the input terminal 88b of the pulse motor driving device 88 to cause same to drive the pulse motor toward the rich (smaller air/fuel ratio) side.(The driving device 88 is adapted to drive the pulse motor 13 toward the lean side and toward the rich side, respectively, when supplied at its input terminals 88a, 88b with a high level signal). On the contrary, if the pulse motor 13 is located on the rich side with the reed switch 23 on, the outputs of the AND circuits 86, 87 are "1" and "0", respectively, so that the driving device 88 drives the pulse motor to the lean side.

When the pulse motor 13 passes through the reference position to reach a position on the rich side during driving the pulse motor 13 toward the rich side, the reed switch 23 turns on. As a result, like the case where the pulse motor 13 is on the rich side at the start of the engine, the outputs of the AND circuits 86, 87 are inverted into "1" and "0", respectively, so that the pulse motor 13 is reversed in driving direction to now be driven toward the lean side.

On the other hand, when the pulse motor 13 passes the reference position during driving the pulse motor toward the lean side, the reed switch 23 turns off to change the potential at the junction P from a low level to a high level. The reference position signal processing circuit 208 is responsive to this change in the potential to produce the aforementioned signals. When supplied with the pulse signal $S_7$ produced by the circuit 208, the OR circuit 93 produces an output "1" and applies it to the flip flop 89 to change the output level at the output terminal 89b to "0". Simultaneously, the output level at the output terminal 89a of the flip flop 89 is changed to "1", to render the AND circuit 90, 91 operative. Consequently, the outputs of the AND circuits 86, 87 both become "0" to cause interruption of the operation of the pulse motor driving device 88. Simultaneously with the above operation, the pulse signal $S_8$ produced by the processing circuit 208 is applied to the register 212 which in turn is triggered by this signal to write the reference position value stored therein (50 steps) into the reversible counter 213. The reversible counter 213 applies this reference position value to one input terminal 210d of the comparator 210. At the same time, the register 212 applies the same reference position value to one input terminal of the AND circuit 102. At this instant, also the other input terminal of the AND circuit 102, which is connected to the output of the reversing time counter 98 by way of the inverter 103, is supplied with a high level signal through the inverter 103 so long as the number of times of reversal of the direction of the pulse motor 13 does not reach a predetermined value (e.g., three times). Accordingly, the above reference position value (50 steps) is applied to the other input terminal 210e of the comparator 210, too. Consequently, the comparator 210 produces an output "1" at its output terminal 210b and applies it to one input terminal of the AND circuit 104. Since as noted above, at this instant the inverter 103 outputs an output "1" to the other input terminal of the AND circuit 104, the AND circuit 104 correspondingly outputs a high level signal "1" to the register 105 which in turn is triggered by this signal "1" to apply the predetermined initial position value $PS_{CR}$ for the pulse motor 13 (e.g., 40 steps, but compensated for atmospheric pressure as previously mentioned), to the input terminal 210e of the comparator 210. As a consequence, the relationship between the two inputs A, B becomes A>B, and accordingly the comparator 210 outputs pulses at its output terminal 210c and applies them to the rich-direction driving input terminal 88b of the pulse motor driving device 88 by way of the AND circuit 91 to cause it to drive the pulse motor 13 in the rich-direction by steps corresponding to the difference between A and B, to thereby set the pulse motor 13 to its predetermined initial position.

In the event that the output of the reed switch 23 does not change even when the pulse motor 13 passes its reference position (50th step), due to a failure in the reed switch 23, the above-mentioned initial position setting operation is not carried out. That is, as previously mentioned, in such event, the pulse motor driving device 88 continues driving the pulse motor toward the lean side or toward the rich side in response to the output signal of the reed switch 23 produced at the start of the pulse motor 13 until the pulse motor 13 is driven to its extreme operating position (120th step or zeroth step). During this driving of the pulse motor 13, the reversible counter 97 counts driving pulses supplied from the driving device 88, and upon counting up the number of steps (120) for the whole pulse motor moving stroke, it applies a signal to the reversing command input terminal 88c of the driving device 88. Responsive to this signal, the driving device 88 drives the pulse motor 13 in the reverse direction to that in which the motor 13 has so far been driven. In this manner, the pulse motor 13 is repeatedly driven in one direction and in its reverse direction alternately along its whole stroke until the reference position of the pulse motor is detected. The reversible counter 97 produces and applies to the reversing time counter 98 a single pulse signal each time the pulse motor 13 has been driven to its extreme operating position on the rich side (zeroth step). The reversing time counter 98 counts the number of such single pulse signals, and when a predetermined number of such signals have been counted, that is, the number of times of reversal of the driving direction of the pulse motor has exceeded a predetermined value (e.g., three times), a reversingtime signal in the form of continuous direct current is applied to the alarm device 99 and the register 100. The register 100, in which is stored the number of steps corresponding to a predetermined position to which the pulse motor is to be set when the pulse motor is at fault, for instance, the predetermined idle position $PS_{IDL}$ ($P_A$) (compensated for atmospheric pressure). When the above reversing time signal has been applied, the register 100 applies its stored data to the input terminal 210e of the comparator 210 via the AND circuit 101. Thus, the AND circuit 101 has its one input terminal supplied with the above reversing time signal, and its other input terminal with a signal composed of bits corresponding to the stored content from the register 100, respectively. At the same time, the reversing time signal of the reversing time counter 98 is also supplied to the reset pulse-input terminal 213b of the reversible counter 213 and the OR circuit 93, whereby the former has its counted value resetted to zero, and the latter sets the flip flop 89 to cause it to produce an output "1" at its output terminal 89a.

On this occasion, the comparator 210 has an input value A of zero applied to its input terminal 210d, and an input value B of the predetermined value $PS_{IDL}$ for the pulse motor, to its input terminal 210e, respectively, so that the relationship A<B stands. Accordingly, a signal corresponding to the difference between the values A, B is outputted from its output terminal 210a to one input terminal of the AND circuit 90. Since at this instant the AND circuit 90 is supplied at its other input terminal with an output "1" from the output terminal 89a of the flip flop 89 as noted above, an output "1" is applied by the AND circuit 90 to the input terminal 88a of the pulse motor driving device 88 to cause it to drive the pulse motor toward the lean side to thereby set the motor to its predetermined idle position. Incidentally, at this instant, the AND circuits 86, 87 are supplied at their respective one input terminals with an output "0" from the output terminal 89b of the flip flop 89 so that the both AND circuits 86, 87 apply outputs "0" to the input of the driving device 88, thus not impeding the above driving of the pulse of the pulse motor to the predetermined idle position.

Although the arrangement of FIG. 10 is such that the reversible counter 97 has its maximum count in accord with the number of steps of the pulse motor 13 between its opposite extreme operating positions, it may be so arranged that the counter 97 has its maximum count equal to the number of steps (e.g., 80 steps) which is the larger of the two numbers of steps each being the number of steps between each of the extreme operating positions and a position slightly beyond the switching point of the reed switch 23 driven from the above extreme operating position. By this arrangement, early detection of a trouble as well as remedy therefor is possible. Even with such arrangement, the reversible counter 97 is adapted to supply a signal to the reversing command input terminal 88c of the pulse motor driving device 88 upon counting down or up predetermined values (0 and 80). Further, the counter 97 applies a single pulse signal to the reversing time counter 98 each time the counted value reaches one of the predetermined values (0). When the number of times of reversal of the driving direction of the pulse motor has exceeded a predetermined value, the pulse motor 13 is driven in the same direction as that in which it has so far been driven, by steps (e.g., 40 steps) obtained by subtracting the maximum number of steps that can be counted by the counter 97 from the number of steps required for the pulse motor 13 to be driven through its whole stroke. At the same time, the reversing time counter 98 supplies a reversing time signal to the alarm device 99, the register 100, the reset pulse-input terminal 213a of the reversible counter 213, the OR circuit 93, etc., like the embodiment in FIG. 10 previously described.

Further, in the above-mentioned arrangements, when the reference position for the pulse motor cannot be detected, it may be arranged such that the pulse motor 13 is driven through steps (e.g., 135) slightly larger than the number of steps (120) for the whole stroke so as to ensure movement of the pulse motor to its extreme operating position. In this case, the reversible counter 97 is adapted to count no more than the number of steps larger than that for the whole stroke (the count is held at 0 or 120).

Further, in the aforementioned embodiment, the pulse motor 13 is driven in the reverse direction to that in which it has so far been driven to be set to the predetermined idle position when the number of the single pulse signals exceeds a pedetermined number (e.g., three times), which are each produced by the reversible counter 97 each time the pulse motor has been driven to a predetermined one of its extreme operating positions. However, alternatively it may be arranged such that the pulse motor is driven in the reverse direction to that in which it has so far been driven to be set to the predetermined idle position, upon occurrence of the aforementioned signal which is produced by the reversible counter 97 when the counter 97 has counted up the number of steps required for the pulse motor to be driven through its whole stroke from one of its extreme operating positions to the other one, and applied to the reversing command input terminal 88c of the pulse motor driving device 88. FIG. 11 illustrates an arrangement applicable to this method. The reversing time counter 98 is omitted here. Instead, the output terminal of the reversible counter 97 for the aforementioned signal is directly connected to the predetermined position counter 100, the reset pulse-input terminal 213b of the reversible counter 213, the OR circuit 93, the AND circuit 101, and the inverter 103. The other parts of the circuit of FIG. 11 are not illustrated since they are identical with corresponding ones of the circuit of FIG. 10. With the FIG. 11 arrangement, when the reed switch 23 is at fault, the aforementioned signal is outputted from the reversible counter 97 to the elements 100, 213, 93, 101, 103 whereby similar operations are carried out to the fail safe and alarm operations mentioned with reference to FIG. 10.

Figure 12B:
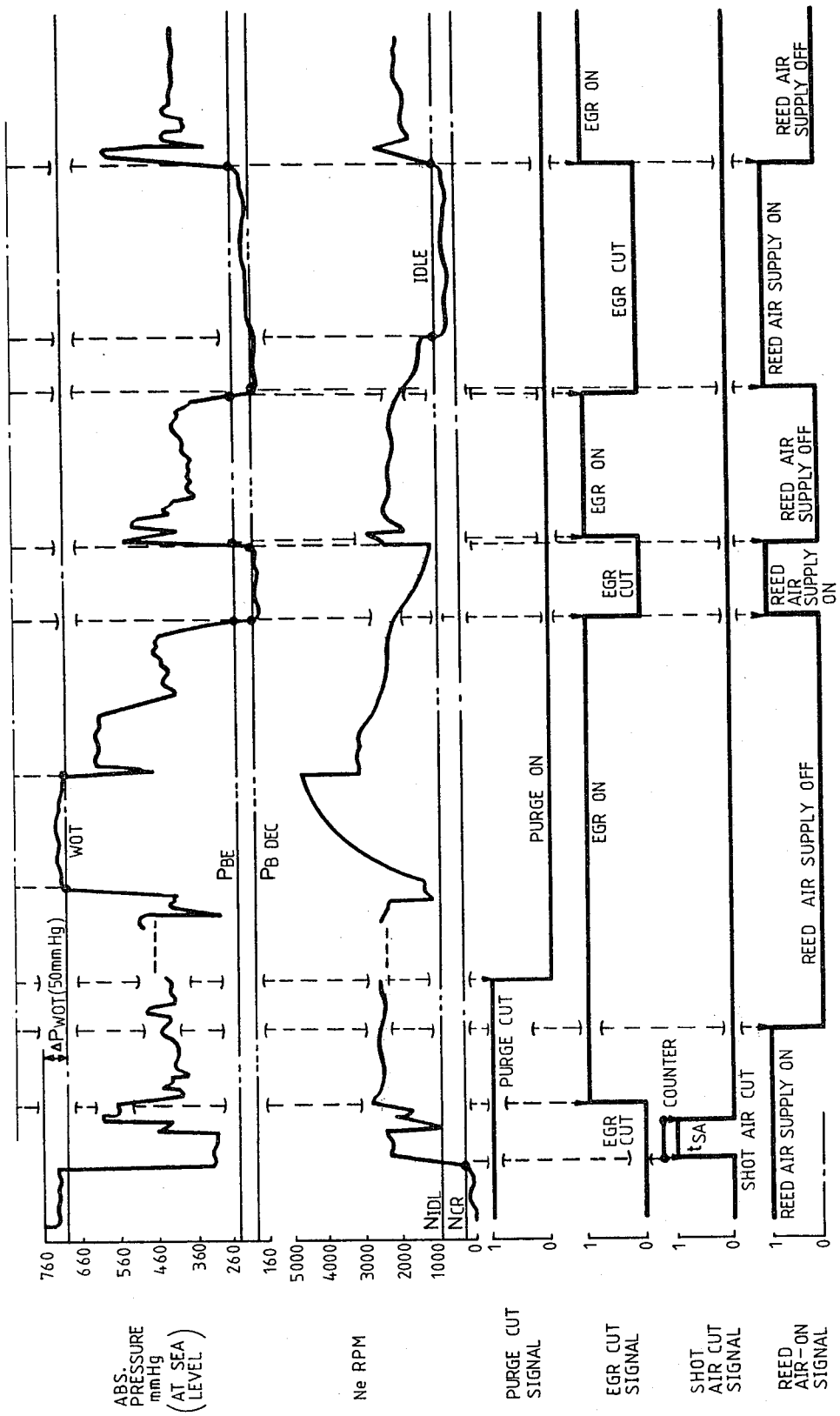
FIG. 12 is a combination of FIG. 12A and 12B and comprises a graph illustrating the operation of the whole system of the invention.

Now, an actual example of the whole operation of the air/fuel ratio control system of the invention will now be described with reference to FIG. 12. FIG. 12 is a graph showing the positions of the pulse motor controlled in various operating conditions of the engine in relation to the outputs of the $O_2$ sensor 68, the thermistor 59, the pressure sensor 76 and the rpm sensor 78, 79 and the control operations of the emission control devices. The operating patterns illustrated in FIG. 12 are those obtained when the reed switch and the sensors are properly operating.

The FIG. 12 graph is divided in stages A-I according to the operating conditions of the engine. First, the stage A illustrates an example of control operation at the start and warming-up of the engine. In the illustrated example, the position of the pulse motor at the start of the engine corresponds to the off side of the reed switch, that is, the lean side of the air/fuel ratio. Upon turning on the ignitiion switch of the engine, the pulse motor is driven toward the rich side since the reed switch is off at this instant, as previously described with reference to FIG. 10. At a point when the reed switch is displaced from its off position to its on position, the pulse motor 13 is reversed to be then driven up to the reference position at which the reed switch again turns off, and further driven to the predertermined initial setting position $PS_{CR}$ and stopped there. It is noted from the graph that this setting of the pulse motor to its initial position is effected when the engine rpm Ne is lower than the predetermined position $N_{CR}$. Then, as the O$_2$ sensor approaches its activated state, its output lowers below the predetermined value Vx, whereas the output Tw of the thermistor or coolant temperature sensor rises above the predetermined value Twx. The air/fuel ratio control initiation condition is fulfilled upon passage of the predetermined period of time tx since the predetermined O$_2$ sensor output value Vx is reached. It is noted that at this stage A, the thermistor output Tw does not yet reach the predetermined value Twp, and accordingly a purge cut signal "1" is supplied from ECU 20 to the solenoid valve 53 in FIG. 1 to carry out purge cut. It is noted that although the absolute pressure $P_B$ in the intake manifold is higher than the predetermined value $P_{BE}$ at this stage A, the thermistor output Tw is lower than the predetermined value $T_{WE}$ at the start of the engine so that an EGR cut signal "0" is supplied to the solenoid valve 75 in FIG. 1 to effect EGR cut until after the value Tw exceeds the value $T_{WE}$. Since during the stage A the control system is in open loop mode, and reed air-on signal "1" is supplied to the solenoid valve 63 in FIG. 1 to actuate the secondary air valve 60 in FIG. 1 for supply of atmospheric air into the exhaust manifold 62. Further, it is noted that when the engine rpm Ne has exceeded the predetermined value $N_{CR}$ which is higher than the cranking rpm, the solenoid valve 38 in FIG. 1 is supplied with a shot air cut signal "1" to effect shot air cut for the predetermined period of time $t_{SA}$.

After fulfillment of the air/fuel ratio control initiation condition, the control operation proceeds from the stage A to the stage B where partial load operation of the engine takes place. The air/fuel ratio control mode is changed from open loop to closed loop. Immediately after entering the closed loop, the pulse motor starts to be controlled with integral term correction. The direction in which the pulse motor starts to be driven is the step-decreasing or rich-direction, since, as noted from the graph, the output voltage of the O$_2$ sensor is then lower than the predetermined value $V_{REF}$, that is, the air/fuel ratio in the exhaust gas is lean. Thereafter, when there is a change in the O$_2$ sensor output from the lean side to the rich side or vice versa, the proportional term control is effected, while so long as the O$_2$ sensor output remains at either the lean side level or the rich side level, the integral term control is carried out. In the graph, the small view encircled by the solid line a' illustrates in details the portion encircled by the break line a. It is noted that the purge cut operation is interrupted when the thermistor output Tw reaches the predetermined value Twp. It is also noted that the supply of reed air or secondary air into the exhaust manifold is interrupted upon entering the closed loop.

When the throttle valve in the intake manifold has come into a wide-open position, as at the stage C, the air/fuel ratio control is effected by open loop, wherein the absolute pressure $P_B$ has suddenly increased to satisfy the relationship of atmospheric pressure (=760 mmHg) $P_A - P_B < \alpha P_{WOT}$ (e.g., 50 mmHg). The pulse motor is moved to the preset position $PS_{WOT}$ and retained there as long as the above wide-open-throttle condition is fulfilled.

The engine condition then changes to the stage D of partial load operation, wherein closed air/fuel ratio control is again carried out in the same manner as at the stage B. At this stage D, the pulse motor can traverse the reference position (50th step) (at point b). As previously mentioned, at this instant, the count in an actual pulse motor position counter, i.e., the counter 213 in FIG. 9 is replaced by the reference value of 50 steps thus to correct the deviation of the count in the counter 213 from the actual pulse motor position.

When the engine comes into a decelerating condition at the stage E, wherein the absolute pressure $P_B$ in the intake manifold lowers below the predetermined value $P_{BDEC}$ so that the pulse motor is moved to and retained at the preset position $PS_{DEC}$. It is noted that at this engine deceleration the EGR cut condition $P_B < P_{BE}$ and the reed air-on condition, that is, the deceleration open loop condition $P_B < P_{BDEC}$ is established to interrupt the EGR operation and carry out supply of air into the exhaust manifold.

Following the operation at the stage E, it is noted that a partial load closed loop control operation beginning with I term correction and a deceleration open loop control operation are carried out in the mentioned order, respectively, at the stages F and G, while there occur changes in the level of the EGR cut signal and the reed air-on signal concurrently with the above control operations.

When the engine subsequently comes into an idling state at the stage H, the pulse motor is set to its predetermined idle position $PS_{IDL}$, while EGR cut takes place upon establishment of the relationship $P_B < P_{BE}$ and supply of reed air is resumed upon establishment of the idling open loop control.

When the engine is accelerated from the above idle operation into a partial load operation at the stage I, the pulse motor is set to the predetermined acceleration position $PS_{ACC}$, while simultaneously the open loop control operation so far effected is replaced by a closed loop control operation which begins with I term correction, like the operation at the stage B. Upon entering this stage I, the EGR operation is resumed and the reed air supply is interrupted.

The arrangement according to the invention that a valve for controlling the air/fuel ratio of a mixture being supplied to an internal combustion engine is driven by a pulse motor, a particular position of which is detected by a position detecting device formed of a reed switch arranged to turn on or off each time the pulse motor passes the above particular position, wherein the above particular position is used as a reference position for determining all other absolute positions of the pulse motor, makes it possible to always achieve accurate air/fuel ratio control by open loop or by closed loop in response to various engine conditions which the engine subsequently undergoes.

Particularly in the open loop control operation at the start and warming-up of the engine, setting of the pulse motor to an optimum position for the start and warming-up operation of the engine with reference to the reference position ensures excellent startability and warming-up driveability of the engine as well as good exhaust emission characteristics.

Although in the illustrated embodiment the air/fuel ratio control valve is arranged across air bleed passages directly connected to fuel passages in the carburetor, an arrangement is applicable to the present invention that such an air/fuel ratio control valve is arranged across an air passage directly connected to the intake manifold. Further, an air/fuel ratio control valve may be arranged across a fuel passage in the carburetor so as to vary the opening of the fuel passage.

What is claimed is:

1. A flow rate control system for controlling the flow rate of a fluid being supplied to an internal combustion engine, which comprises: valve means for varying the flow rate of one of air and fuel, forming said fluid, to thereby control the air/fuel ratio of an air/fuel mixture being supplied to said engine; a pulse motor for driving said valve means; position detecting means for detecting the valve position of said valve means with respect to a reference position to produce two different levels of output depending upon a detected valve position; and an electrical circuit connected to said pulse motor, said position detecting means and a power switch, said electrical circuit being arranged for operation such that: (a) when said position detecting means produces one level of output upon turning on said power switch, said electrical circuit drives said pulse motor in the direction of said reference position until said position detecting means produces the other level of output; (b) when said position detecting means produces said other level of output upon turning on said power switch or when said position detecting means has come to produce said other level of output as a result of said driving of said pulse motor in said paragraph (a), said electrical circuit drives said pulse motor in the direction of said reference position until sad position detecting means produces said one level of output: and (c) said electrical circuit is responsive to occurrence of said one level of output during said driving of said pulse motor in said paragraph (b), to stop said pulse motor.

2. An air/fuel ratio control system for controlling the air/fuel ratio of a mixture being supplied to an internal combustion engine, which comprises: a carburetor for producing said mixture; valve means for controlling the air/fuel ratio of said mixture; a pulse motor for driving said valve means; position detecting means for detecting the valve position of said valve means with respect to a reference position to produce two different levels of output depending upon a detected valve position; and an electrical circuit connected to said pulse motor, said position detecting means and a power switch, said electrical circuit being arranged for operation such that: (a) when said position detecting means produces one level of output upon turning on said power switch, said electrical circuit drives said pulse motor in the direction of said reference position until said position detecting means produces the other level of output: (b) when said position detecting means produces said other level of output upon turning on said power switch or when said position detecting means has come to produce said other level of output as a result of said driving of said pulse motor in said paragraph (a), said electrical circuit drives said pulse motor in the direction of said reference position until said position detecting means produces said one level of output: and (c) said electrical circuit is responsive to occurrence of said one level of output during said driving of said pulse motor in said paragraph (b), to stop said pulse motor.

3. An air/fuel ratio control system for controlling by means of feedback the air/fuel ratio of a mixture being supplied to an internal combustion engine, which comprises: means for detecting the concentration of an ingredient in exhaust gases emitted from said engine; a carburetor for producing said mixture; means connecting said concentration detecting means to said carburetor in a manner such as to control the air/fuel ratio of said mixture to predetermined values by means of feedback, in response to an output signal produced by said concentration detecting means, said connecting means comprising a valve for controlling the air/fuel ratio of said mixture, a pulse motor for driving said valve, and an electrical circuit for controlling said pulse motor; and means for detecting the position of said valve with respect to a reference position to produce two different levels of output depending upon a detected valve position; wherein said electrical circuit is connected to said power switch and said position detecting means for operation such that: (a) when said position detecting means produces one level of output upon turning on said power switch, said electrical circuit drives said pulse motor in the direction of said reference position until said position detecting means produces the other level of output: (b) when said position detecting means produces said other level of output upon turning on said power switch or when said position detecting means has come to produce said other level of output as a result of said driving of said pulse motor in said paragraph (a), said electrical circuit drives said pulse motor in the direction of said reference position until said position detecting means produces said one level of output: and (c) said electrical circuit is responsive to occurrence of said one level of output during said driving of said pulse motor in said paragraph (b), to stop said pulse motor.

4. The air/fuel ratio control system as claimed in claim 3, wherein said electrical circuit comprises: a reversible counter for storing an actual position of said pulse motor; a register storing a predetermined value corresponding to said reference position; and means responsive to a change in the output of said position detecting means from said other level to said one level to make said reversible counter have a counted value thereof coincide with said predetermined value stored in said register.

5. The air/fuel ratio control system as claimed in claim 4, wherein said electrical circuit comprises: means for driving said pulse motor to an extreme operating position thereof so long as there is no change in the level of output of said position detecting means during driving said pulse motor; means for driving said pulse motor within a predetermined operating range including said reference position a plurality of times over, after said pulse motor has been driven to said extreme operating position; and means for producing a signal indicative of abnormality when there is no change in the level of output of said position detecting means after said plurality of times of driving said pulse motor.

6. The air/fuel ratio control system as claimed in claim 4, wherein said electrical circuit includes a counter arranged to count driving pulses supplied to said pulse motor and produce a predetermined signal when the count in said counter exceeds a required number of driving pulses for said pulse motor to be driven from one extreme operation position thereof to another opposite extreme position thereof.

7. The air/fuel ratio control system as claimed in claim 6, wherein said electrical circuit comprises: means responsive to said predetermined signal to reverse the driving direction of said pulse motor; means for producing a signal when said pulse motor has been driven to one of said extreme operating positions thereof; and a counter for counting the number of times of occurrence of said lastmentioned signal to produce a predetermined time signal upon counting up to a predetermined number.

8. The air/fuel ratio control system as claimed in claim 6 or claim 7, wherein said electrical circuit includes means responsive to said predetermined signal to drive said pulse motor in a reverse direction to that in which said pulse motor has so far been driven, by a predetermined number of steps.

9. The air/fuel ratio control system as claimed in claim 6 or claim 7, wherein said electrical circuit includes means responsive to said predetermined time signal to drive said pulse motor in a reverse direction to that in which said pulse motor has so far been driven, by a predetermined number of steps.

10. The air/fuel ratio control system as claimed in claim 6 or claim 7, wherein said electrical circuit includes means responsive to said predetermined signal to give an alarm.

11. The air/fuel ratio control system as claimed in claim 6 or claim 7, wherein said electrical circuit includes means responsive to said predetermined time signal to give an alarm.

12. The air/fuel ratio control system as claimed in any one of claims 3 through 7, wherein said electrical circuit includes means for driving said pulse motor, upon occurrence of said one level of output of said position detecting means, by a predetermined number of steps as a function of parameters of the operating condition of said engine, and then stopping said pulse motor.

* * * * *